(12) United States Patent
Lee et al.

(10) Patent No.: US 11,468,123 B2
(45) Date of Patent: Oct. 11, 2022

(54) CO-REFERENCE UNDERSTANDING ELECTRONIC APPARATUS AND CONTROLLING METHOD THEREOF

(71) Applicant: SAMSUNG ELECTRONICS CO., LTD., Suwon-si (KR)

(72) Inventors: Kangwook Lee, Suwon-si (KR); Jaewon Kim, Suwon-si (KR); Jiin Nam, Suwon-si (KR); Huiwon Yun, Seoul (KR); Hojin Jung, Suwon-si (KR); Kunal Chawla, Seoul (KR); Akhil Kedia, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 16/942,086

(22) Filed: Jul. 29, 2020

(65) Prior Publication Data

US 2021/0049214 A1 Feb. 18, 2021

(30) Foreign Application Priority Data

Aug. 13, 2019 (KR) .................. 10-2019-0099131

(51) Int. Cl.
*G06F 16/9032* (2019.01)
*G10L 15/22* (2006.01)
*B25J 11/00* (2006.01)

(52) U.S. Cl.
CPC ..... *G06F 16/90332* (2019.01); *B25J 11/0005* (2013.01); *G10L 15/22* (2013.01); *G10L 2015/228* (2013.01)

(58) Field of Classification Search
CPC ........... G06F 16/90332; B25J 11/0005; G10L 15/22; G10L 2015/228
See application file for complete search history.

(56) References Cited

U.S. PATENT DOCUMENTS 9,858,925 B2   1/2018  Gruber et al.
9,966,069 B2   5/2018  Lee et al.
(Continued)

FOREIGN PATENT DOCUMENTS

JP    2006-236113      9/2006
KR    10-2009-0084212  8/2009
(Continued)

OTHER PUBLICATIONS

International Search Report and Written Opinion dated Oct. 26, 2020 in corresponding International Application No. PCT/KR2020/010189.

(Continued)

*Primary Examiner* — Mohammad K Islam
(74) *Attorney, Agent, or Firm* — Nixon & Vanderhye P.C.

(57) ABSTRACT

Disclosed is an electronic apparatus providing a reply to a query of a user. The electronic apparatus includes a microphone, a camera, a memory configured to store at least one instruction, and at least one processor, and the processor is configured to execute the at least one instruction to control the electronic apparatus to: identify a region of interest corresponding to a co-reference in an image acquired through the camera based on a co-reference being included in the query, identify an object referred to by the co-reference among at least one object included in the identified region of interest based on a dialogue content that includes the query, and provide information on the identified object as the reply.

16 Claims, 24 Drawing Sheets

(56) References Cited

U.S. PATENT DOCUMENTS

| | | | |
|---|---|---|---|
| 9,996,069 B2 | 5/2018 | Lee et al. | |
| 10,427,306 B1* | 10/2019 | Quinlan | B25J 9/1697 |
| 10,943,308 B1* | 3/2021 | Brandt | G10L 17/06 |
| 2002/0041327 A1 | 4/2002 | Hildreth et al. | |
| 2012/0239396 A1* | 9/2012 | Johnston | H04N 21/42203 |
| | | | 704/235 |
| 2013/0030811 A1 | 1/2013 | Olleon et al. | |
| 2014/0361973 A1 | 12/2014 | Raux et al. | |
| 2015/0116487 A1 | 4/2015 | Ptitsyn | |
| 2016/0335051 A1 | 11/2016 | Osawa et al. | |
| 2018/0046851 A1 | 2/2018 | Kienzle et al. | |
| 2018/0248710 A1 | 8/2018 | Yu et al. | |
| 2018/0336414 A1* | 11/2018 | Badr | H04L 51/02 |
| 2019/0180343 A1* | 6/2019 | Arnett | G06Q 30/0633 |
| 2019/0206400 A1 | 7/2019 | Cui et al. | |
| 2019/0324279 A1 | 10/2019 | Hwang et al. | |
| 2019/0370035 A1* | 12/2019 | Ramachandra Iyer | |
| | | | G06F 9/453 |
| 2020/0394436 A1* | 12/2020 | Rakshit | H04L 67/125 |

FOREIGN PATENT DOCUMENTS

| | | |
|---|---|---|
| KR | 10-2010-0072841 | 7/2010 |
| KR | 10-1370539 | 3/2014 |
| KR | 10-2018-0071092 | 6/2018 |
| KR | 10-2019-0040164 | 4/2019 |
| WO | WO 2017/112813 | 6/2017 |

OTHER PUBLICATIONS

European Search Report dated Apr. 26, 2022 for EP Application No. 20852306.8.

* cited by examiner

100

100

CO-REFERENCE UNDERSTANDING ELECTRONIC APPARATUS AND CONTROLLING METHOD THEREOF

CROSS-REFERENCE TO RELATED APPLICATION

This application is based on and claims priority under 35 U.S.C. § 119(a) to Korean patent application number 10-2019-0099131, filed on Aug. 13, 2019, in the Korean Intellectual Property Office, the disclosure of each of which is incorporated by reference herein in its entirety.

BACKGROUND

1. Field

The disclosure relates to an electronic apparatus that provides a response to a user inquiry. For example, the disclosure relates to an electronic apparatus that considers various factors related to a user and an ambient environment in a composited manner, in order to correctly understand a meaning of a co-reference that is uttered by a user.

2. Description of Related Art

In the related-art, various studies have been conducted on an artificial intelligence model (AI) that is capable of understanding the content of user's utterance content and provide answers thereto. The AI model could be used, for example, in a robot or the like for responding to a visitor in a shop in which a plurality of goods are displayed.

If a co-reference is included in a sentence uttered by a person, a meaning of the co-reference itself cannot be clearly understood and thus, with only an electronic apparatus that includes a related-art AI model, it has been difficult to provide an appropriate response by clearly understanding the co-reference.

SUMMARY

Embodiments of the disclosure provide an electronic apparatus, the electronic apparatus may include a microphone, a camera, a memory configured to store at least one instruction, and at least one processor connected to the microphone, the camera, and the memory, and the processor is configured, by executing the at least one instruction, to control the electronic apparatus to: obtain a text corresponding to a voice that is input through the microphone, provide a reply to a query based on the query being included in the obtained text, identify a region of interest corresponding to a co-reference in an image obtained through the camera based on the co-reference being included in the query, identify an object referred to by the co-reference among at least one object included in the identified region of interest based on a dialogue content that includes the query, and provide information on the identified object as the reply.

According to an example embodiment, a method of controlling an electronic apparatus that provides a response to a query, in response to the input query, includes, based on a co-reference being included in the query; identifying a region of interest corresponding to the co-reference in an image obtained through the camera; identifying an object referred to by the co-reference; and providing information on the identified object as the reply.

BRIEF DESCRIPTION OF THE DRAWINGS

The above and other aspects, features, and advantages of certain embodiments of the disclosure will be more apparent from the following detailed description, taken in conjunction with the accompanying drawings, in which.

Throughout the drawings, like reference numerals will be understood to refer to like parts, components, and structures.

DETAILED DESCRIPTION

Figure 1A:
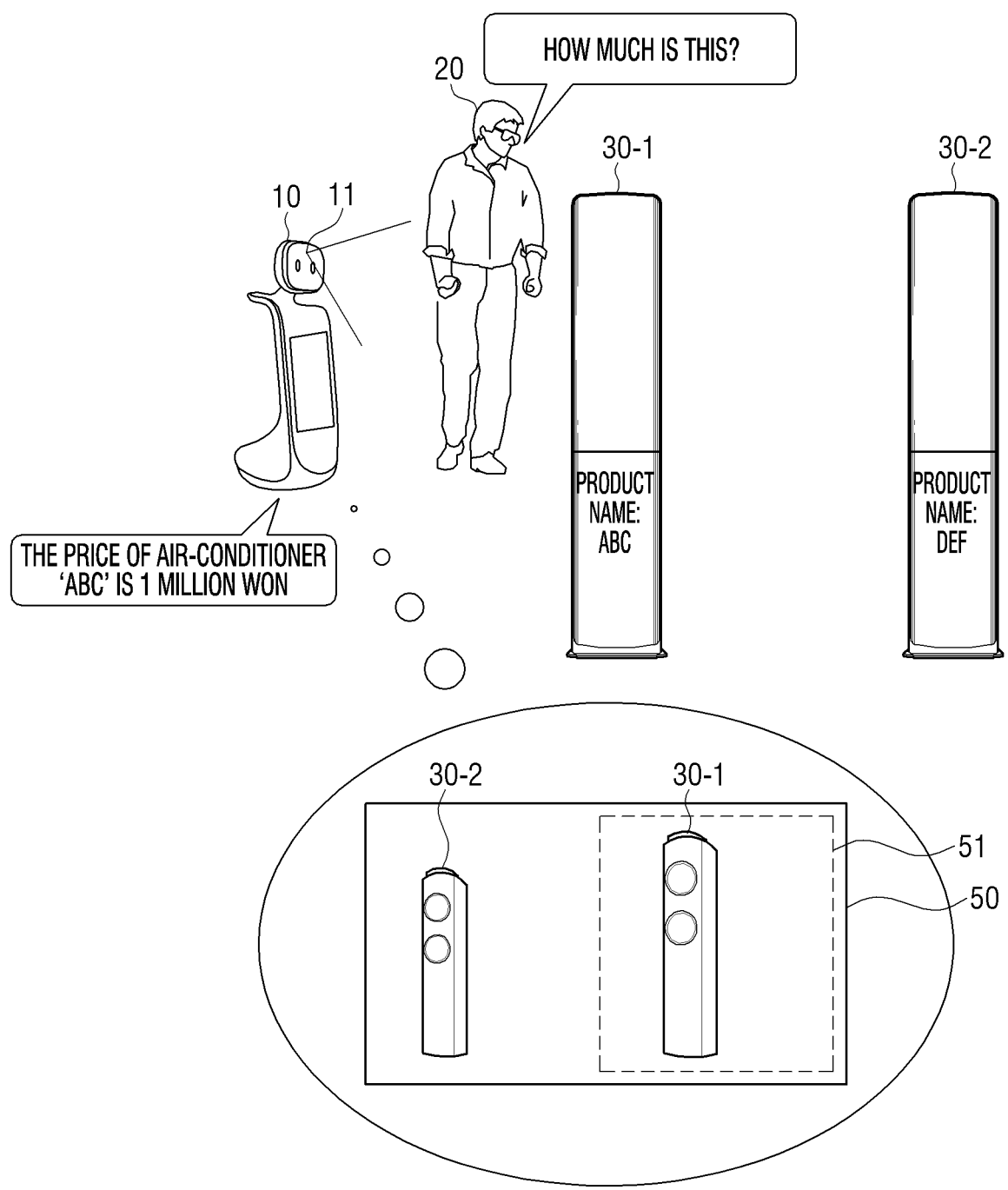
FIGS. 1A and 1B are diagrams illustrating example embodiments in which an electronic apparatus identifies an object referred to by a co-reference using an attribute of the co-reference according to an embodiment.

The disclosure provides an electronic apparatus capable of clearly recognizing an object referred to by a co-reference on an image captured through a camera using a distance attribute of the co-reference and the number of objects referred to by the co-reference, or the like, even if the co-reference is included in the input voice of the user.

Before describing the disclosure in detail, an overview for understanding the present disclosure and drawings will be provided.

The terms used in the present disclosure and the claims are general terms identified in consideration of the functions of the various example embodiments of the disclosure. However, these terms may vary depending on intention, legal or technical interpretation, emergence of new technologies, and the like of those skilled in the related art. Also, some arbitrary terms may be used. Unless there is a specific definition of a term, the term may be understood based on the overall contents and technological common sense of those skilled in the related art.

Further, like reference numerals indicate like components that perform substantially the same functions throughout the disclosure. For convenience of descriptions and understanding, the same reference numerals or symbols are used and described in different example embodiments. In other words, although elements having the same reference numerals are all illustrated in a plurality of drawings, the plurality of drawings do not refer to one embodiment.

The terms such as "first," "second," and so on may be used to describe a variety of elements, but the elements should not be limited by these terms. The terms are used for the purpose of distinguishing one element from another. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise" or "consist of" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part", and so on may refer, for example, to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

When any part is connected to another part, this includes a direct connection and an indirect connection through another medium. Further, when a certain part includes a certain element, unless specified to the contrary, another element may be additionally included, rather than precluding another element.

Figure 1B:
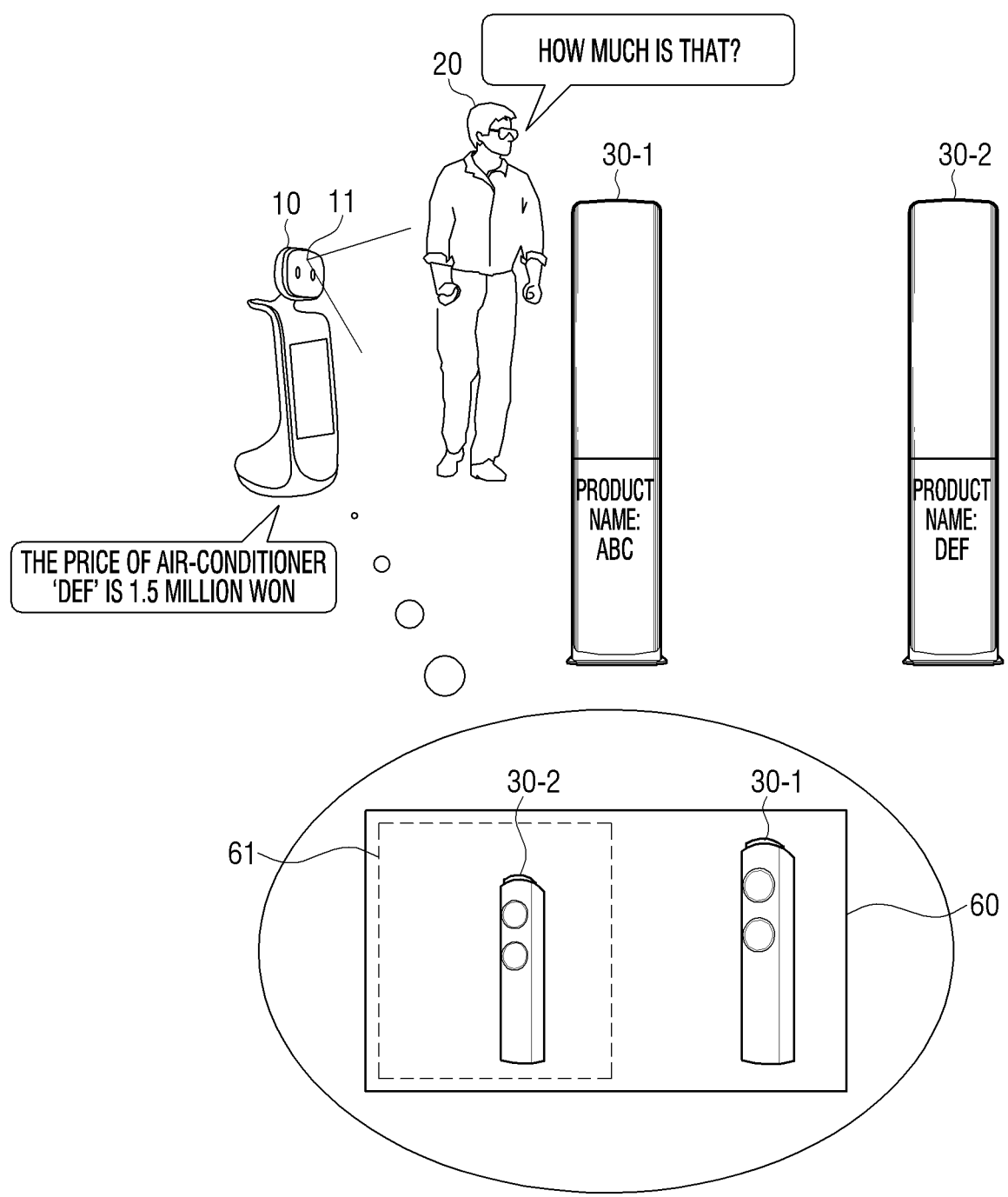

FIGS. 1A and 1B are diagrams illustrating example embodiments in which an electronic apparatus identifies an object referred to by a co-reference using an attribute of the co-reference according to an embodiment.

Referring to FIG. 1A, when a voice "How much is this?" is input by a user 20, the electronic apparatus 10 that may, for example, be implemented as a robot 10 may identify an object which the co-reference of "this" refers to in an image that is obtained through a camera 11.

Referring to FIG. 1A, in an image 50 that is obtained by the electronic apparatus 10 through the camera 11 includes a plurality of objects, not just one, for example, an air-conditioner "ABC" 30-1 and an air-conditioner "DEF" 30-2.

Referring to FIG. 1A, the electronic apparatus 10 may identify a region 51 that is comparatively close region on the image 50 according to a distance attribute of "This" as a region of interest (ROI), and in this case, the electronic apparatus 10 may identify the air-conditioner "ABC" 30-1 included in the region 51 of interest as an object which "this" refers to.

The electronic apparatus 10 may provide information of "a price of the air-conditioner 'ABC' is 1 million Won" visually or audibly, in response to a user inquiry of "How much is this?".

FIG. 1B is a diagram in which a voice of "how much is this?" is input from the user.

Referring to FIG. 1B, the electronic apparatus 10 may identify a region 61 that is comparatively distant on an image 60 according to a distance attribute of "that" as a region of interest, and in this case, the electronic apparatus 10 may identify the air-conditioner "DEF" 30-2 included in a region 61 of interest as an object which "that" refers to.

The electronic apparatus 10 may provide information of "a price of the air-conditioner 'DEF' is 1.5 million Won" visually or audibly, in response to a user inquiry of "How much is this?"

As such, the electronic apparatus according to an embodiment may identify an object which each co-reference refers to for each situation more correctly, as a result of using an attribute of the co-reference itself for object recognition.

The configurations and operations of the disclosure will be described in greater detail below with reference to the various drawings.

Figure 2A:
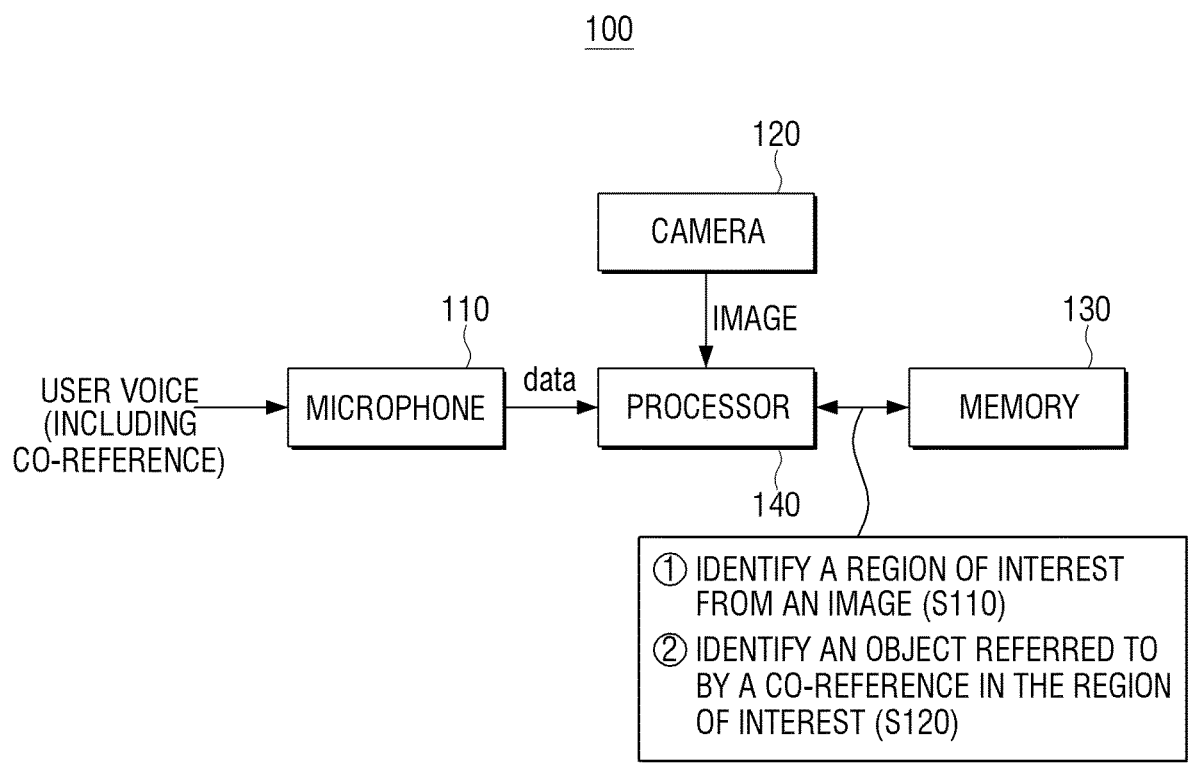
FIGS. 2A and 2B are block diagrams illustrating an example configuration/operation of the electronic apparatus based on hardware and/or software according to an embodiment.

FIG. 2A is a block diagram illustrating an example configuration and operation of the electronic apparatus based on hardware according to an embodiment.

Referring to FIG. 2A, the electronic apparatus 100 according to an embodiment may include a microphone 110, a camera 120, a memory 130, and a processor (e.g., including processing circuitry) 140.

The electronic apparatus 100 may be implemented as a fixed type/mobile type robot. For example, the electronic apparatus 100 may be used as a guiding robot that recognizes a content of a user's utterance and provides information necessary for a user in a facility and space having various purposes.

The electronic apparatus 100 may be implemented as a wearable device such as, for example, and without limitation, a smart watch, smart glasses, or the like, and may also be implemented as various terminal devices such as, for example, and without limitation, a smartphone, a tablet PC, or the like. However, it will be understood that the electronic apparatus is not limited to these examples and may be any of various electronic apparatuses.

The microphone 110 may include, for example, a circuit and may convert an audio signal to an electric signal. The electronic apparatus 100 may receive a user voice through the microphone 110, and a plurality of microphones may be provided in the electronic apparatus 100 in order to find a position of a user who uttered an input voice.

The camera 120 may include, for example, a configuration to acquire an image around the electronic apparatus 100 and may include, for example, and without limitation, a red-green-blue (RGB) camera, a depth camera, an RGB-D (depth) camera, or the like.

The electronic apparatus 100 may acquire not only an RGB image around the electronic apparatus 100 but also a depth image through the camera 120.

The memory 130 may store at least one instruction or data related to an element of the electronic apparatus 100 and operating system (OS) for controlling overall operations of the elements of the electronic apparatus 100.

The processor 140 may include various processing circuitry and perform an operation according to various embodiments to be described in greater detail below by executing at least one instruction stored in the memory 130.

The memory 130 may include a non-volatile memory such as a read-only memory (ROM), a flash memory, or the like, and may include a volatile memory such dynamic random access memory (DRAM), or the like. The memory 130 may include a hard disk, a solid state drive (SSD), or the like.

The processor 140 may be connected to the microphone 110, the camera 120, the memory 130, and may control the electronic apparatus 100 by executing at least one instruction stored in the memory 130.

For this purpose, the processor 140 may be implemented as various processing circuitry, such as, for example, and without limitation, a general use processor such as a central processing unit (CPU), an application processor (AP), a graphics-only processer such as a graphic processing unit (GPU), a vision processing unit (VPU), or an artificial intelligence processor such as a neural processing unit (NPU), or the like. The processor 140 may include, for example, a volatile memory such as a static random access memory (SRAM).

For example, the memory 130 including the ROM and the RAM and the processor 140 may be included in the same chip in the electronic apparatus 100. In addition, a plurality of chips including different types of processors may be included in the electronic apparatus 100. However, this is merely an example, and physical configurations of the memory 130 and the processor 140 in the electronic apparatus 100 are not limited to the above-described examples.

Figure 2B:
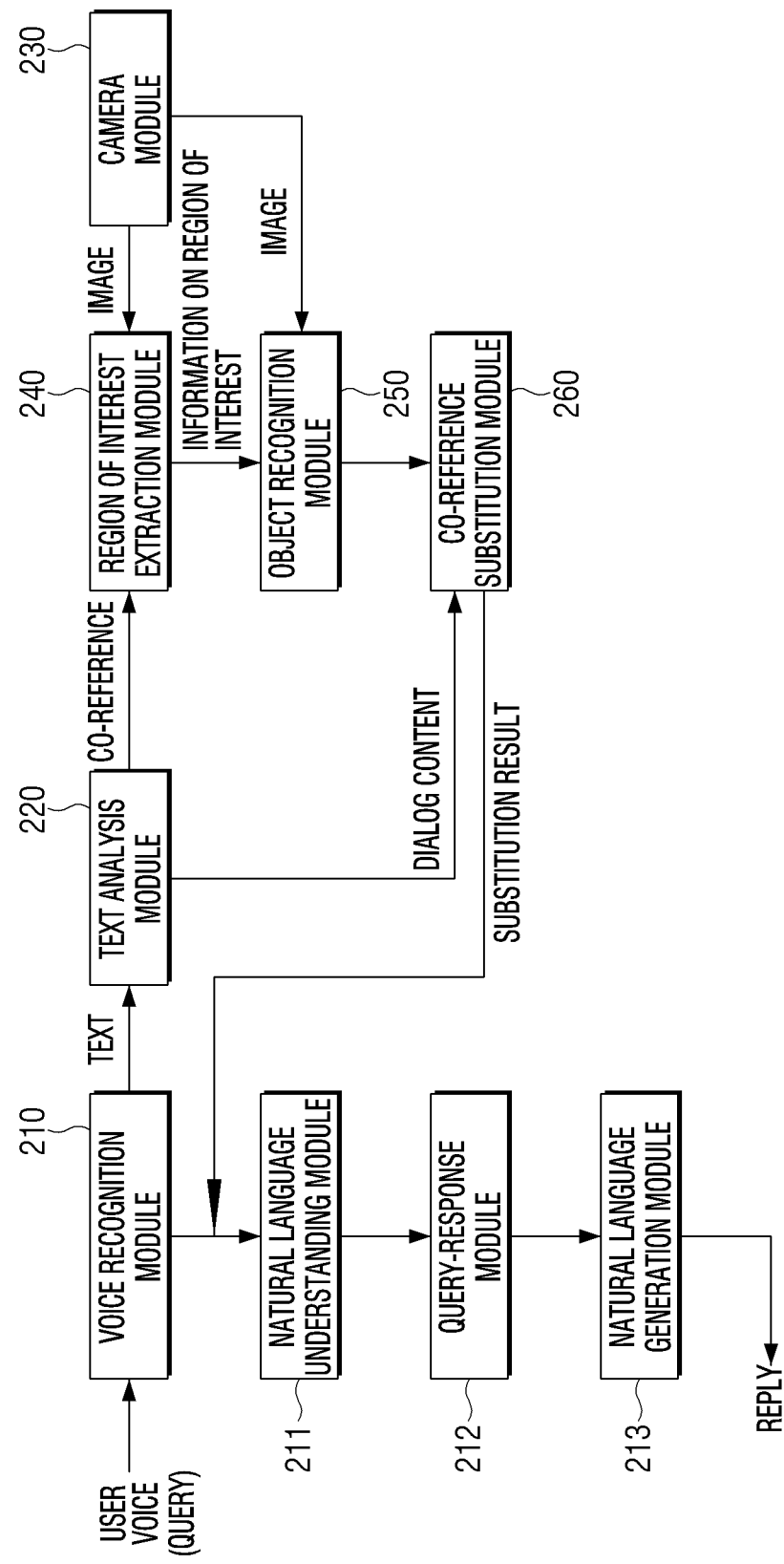

The electronic apparatus 100 according to an embodiment may include various modules including, without limitation, those illustrated in FIG. 2B. Each of the modules illustrated in FIG. 2B may be implemented as the ROM on the memory 130 or software in hard disk/SSD on the memory 130, and may be controlled through the processor 140. At least one of the modules may be implemented as hardware and, in some cases, at least one of the modules may be implemented as a hardware circuit only.

Referring to FIG. 2B, the electronic apparatus 100 may include a voice recognition module (e.g., including processing circuitry and/or executable program elements) 210, a natural language understanding module (e.g., including processing circuitry and/or executable program elements) 211, a query-response module (e.g., including processing circuitry and/or executable program elements) 212, a natural language generation module (e.g., including processing circuitry and/or executable program elements) 213, a text analysis module (e.g., including processing circuitry and/or executable program elements) 220, a camera module 230, a region of interest extraction module (e.g., including processing circuitry and/or executable program elements) 240, an object recognition module (e.g., including processing circuitry and/or executable program elements) 250, a co-reference substitution module (e.g., including processing circuitry and/or executable program elements) 260, or the like.

The processor 140 may obtain a text corresponding to a user voice that is input through the microphone 110, and when a query is included in the obtained text, the processor 140 may provide a response to the query.

In this case, the processor 140 may recognize the input user's voice through the voice recognition module 210 and convert the voice into text. For this purpose, the voice recognition module 210 may include various processing circuitry and/or executable program elements, such as, for example, and without limitation, a noise removing module, an automatic speech recognition (ASR) module, or the like. For example, the processor 140 may extract at least one feature information from an audio signal (user's voice), compare the feature information with an acoustic model to extract one or more phonemes, and generate a text including at least one word/sentence by combining the extracted phonemes based on a language model.

The processor 140 may convert a text to a machine language through the natural language understanding module 211, and identify meaning of at least one word/sentence included in the text. The processor 140 may use, for example, and without limitation, an AI model that is trained to perform at least one of morphological analysis, syntactic analysis, semantic analysis, and pragmatic analysis.

If the user's voice is identified as corresponding to the query, the processor 140 may acquire a response corresponding to the query in the form of a machine language through the query-response module 212. In this case, the processor 140 may generate a response to the query using a database including information on various objects. For example, the database may include, for example, and without limitation, information on product names, types (for example: a refrigerator, a bed, smartphone, an air purifier, etc.), size, color, price, performance, release date, functions, producer, production location, or the like, of each of the plurality of products.

The processor 140 may generate a response text using acquired machine language through the natural language generation module 213.

The processor 140 may provide a response to the query. The processor 140 may output the generated response text visually and audibly through a display (not shown) or a speaker (not shown).

However, if the co-reference is included in the user's query, a problem may occur. In the disclosure, the co-reference may refer, for example, to a word referring to one or more specific objects, and is a word that may replace a name, a product name, or the like, of the object according to circumstances. The co-reference may include a substitute word that includes a part of information on a referred object such as "this air-conditioner", "this device," "those air purifiers," "this boy," "that person," as well as a pronoun such as "this thing", "that thing", "this", "that", "these", "those", "it", or the like.

If the co-reference is included in the user's query, an object referred by the co-reference may not be clear and thus, if the processor 140 uses the query-response module 212 and the natural language generation module 213, an appropriate response that is suitable for the corresponding query may not be provided.

The processor 140 may determine, via the text analysis module 220, whether the co-reference is included in the text corresponding to the voice of the user. In this case, the processor 140 may perform, for example, and without limitation, at least one of morphological analysis, syntactic analysis, semantic analysis, and pragmatic analysis through the text analysis module 220, and extract the co-reference included in the text through the word class tagging.

When the co-reference is included in the query of the user, the processor 140 may identify a region of interest corresponding to the co-reference in the image acquired through the camera 120 in operation S110, and may identify an object referred to by the co-reference in the identified region of interest in operation S120.

In operation S110, the processor 140 may identify a region of interest from an acquired image according to an attribute of the co-reference that is identified through the text analysis module 220. In this case, the processor 140 may identify a region of interest through the region of interest extraction module 240.

Hereinbelow, through FIGS. 3A, 3B, 4, 5A, 5B, 6A, and 6B, various example embodiments of identifying a region of interest according to an attribute of the co-reference by the processor 140 will be described in greater detail.

The processor 140 may identify a different region in the acquired image as the region of interest according to a distance attribute which the co-reference has.

When the co-reference refers to an object of a short distance, the processor 140 may identify a region located at a relatively close distance in the acquired image as a region of interest, and when the co-reference refers to a more distant object, the processor 140 may identify a region of relatively long distance from the acquired image as the region of interest.

The processor 140 may identify a distance between each region in the depth image and the electronic apparatus through the depth image that is acquired through the camera 120, and identify a region of interest in the depth image according to the identified distance and a distance attribute of the co-reference.

Figure 3A:
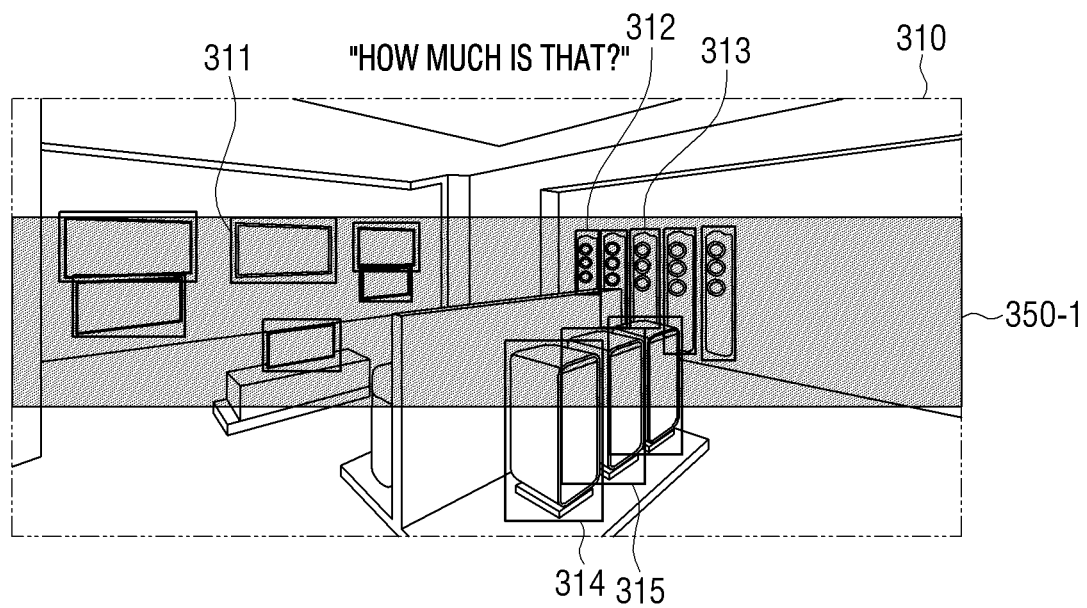
FIGS. 3A and 3B are diagrams illustrating an example embodiment identifying a region of interest according to a distance attribute of a co-reference to identify an object referred to by the co-reference according to an embodiment.
Figure 3B:
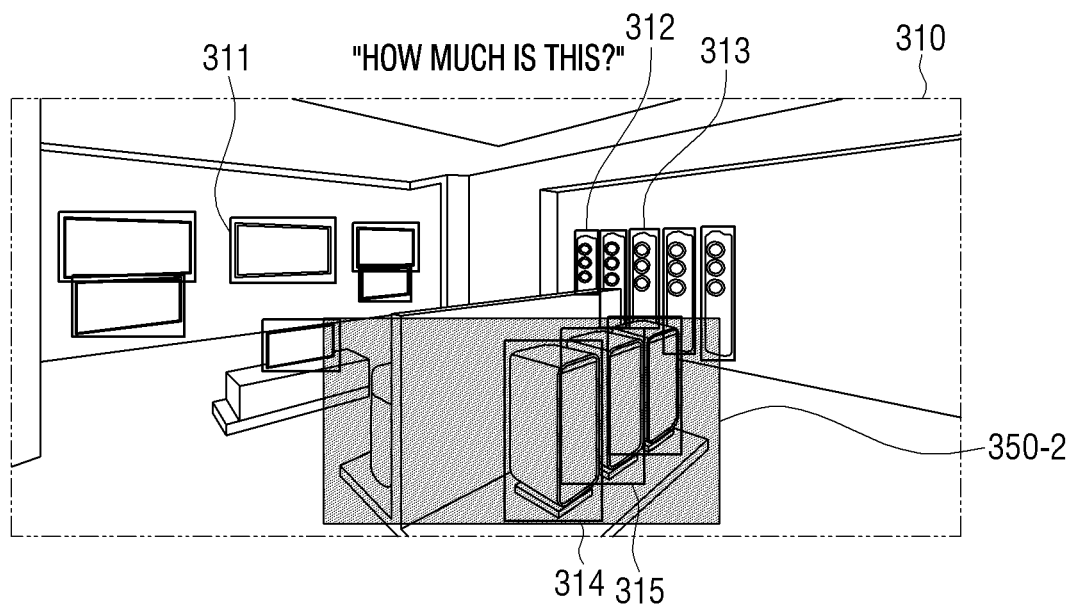

FIGS. 3A and 3B are diagrams illustrating an example embodiment identifying a region of interest according to a distance attribute of a co-reference in order to identify an object referred to by the co-reference according to an embodiment.

Referring to FIG. 3A, when the user's query of "How much is that?" is input, the processor 140 may identify a region 350-1 that is located at a relatively distant distance in the image 310 as the region of interest according to a distance attribute of the co-reference "that" which refers to an object at a relatively long distance.

As a result, referring to FIG. 3A, regions 311, 312, and 313 of objects located relatively far from the electronic apparatus 100 within the image 310 are included in the region of interest 350-1, but regions 314 and 315 of objects located relatively close to the electronic apparatus 100 in the image 310 may not be included in the region of interest 350-1.

The regions 311, 312, 313, 314, 315 and/or corresponding objects of objects may be recognized by the object recognition module 250. The object recognition module 250 may, for example, use an artificial intelligence model that is trained to identify a region in which at least one object exists on the image when an image is input and/or an artificial intelligence model that is trained to identify which objects are included in the image.

Referring to FIG. 3B, when the user query of "How much is this?" is input, the processor 140 may identify a region 350-2 that is located at a relatively closer distance in the image 310 as the region of interest according to a distance attribute of the co-reference "this" referring to an object at a relatively closer location.

As a result, referring to FIG. 3B, regions 311, 312, and 313 of objects located relatively far from the electronic apparatus 100 within the image 310 are not included in the region of interest 350-2, but regions 314 and 315 of objects located relatively close to the electronic apparatus 100 from the image 310 may be included in the region of interest 350-2.

When a plurality of co-references are input, the processor 140 may identify a region of interest according to a relative location relation among the co-references.

For example, it may be assumed that a first co-reference is included in the user's query and a second co-reference is included in the corresponding query or a query that is input after the corresponding query.

In this case, if the first object referred to by the first co-reference is identified in one region of the acquired image, the processor 140 may determine a relative positional relationship between the first object and a second object referred to by the second co-reference, based on the distance attribute of the first co-reference and the second co-reference.

The processor 140 may identify a region having the relative positional relationship which has been determined precedingly as a region of interest corresponding to the second co-reference, based on one region in which the first object is identified.

Figure 4:
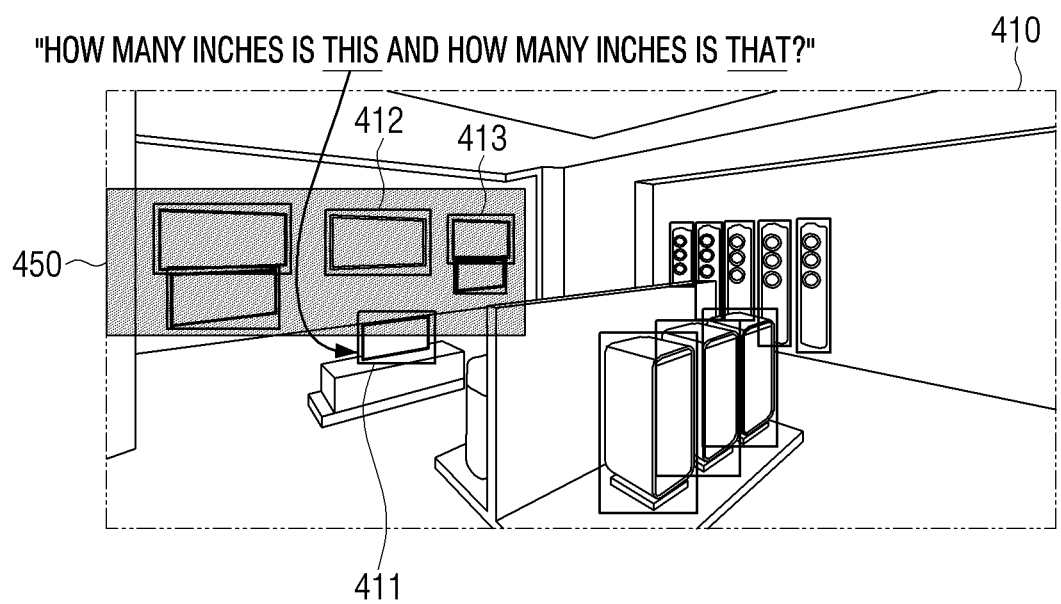
FIG. 4 is a diagram illustrating an example embodiment identifying a region of interest according to a relative distance attribute between the co-references by the electronic apparatus according to an embodiment.

FIG. 4 is a diagram illustrating an embodiment identifying a region of interest according to a relative distance attribute between the co-references by the electronic apparatus according to an embodiment.

In FIG. 4, it is assumed a situation that a user query of "how many inches is this and how many inches is that?" is input. Also, in FIG. 4, it is assumed that a situation that an object referred to by "this" included in the corresponding query is identified as an object included in a region 411.

The processor 140 may determine a relative positional relation that the object which "that" refers to is located farther than the objet which "this" refers to, in consideration of the distance attribute of each of the co-reference "this" and the co-reference "that".

The processor 140 may identify a region 450 that is farther than a region 411 in the image 410 in which an object referred to by "this" as a region of interest for identifying an object referred to by "that."

The processor 140 may identify a region of interest according to the number of objects referred to by the co-reference.

In this case, the processor 140 may identify at least one region in each of which one object exists in the image acquired through the object recognition module 250. The processor 140 may identify a region of interest corresponding to the co-reference based on the density of the identified region in the acquired image.

For example, if the co-reference is a co-reference that refers to a singular object, the processor 140 may identify a region of interest in which the density of the region identified in the acquired image is relatively low, and if the co-reference is a co-reference that refers to a plurality of objects, the processor 140 may identify a region of interest in which the density of the region identified in the acquired image is relatively high as a region of interest.

Figure 5A:
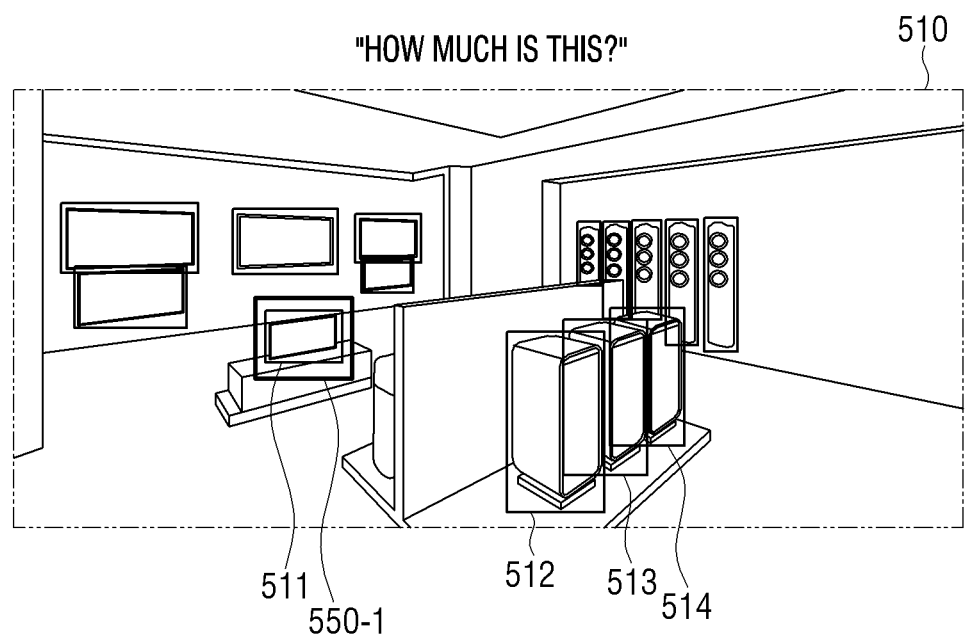
FIGS. 5A and 5B are diagrams illustrating an example embodiment identifying a region of interest according to the number of objects referred to by the co-reference by the electronic apparatus according to an embodiment.

In FIG. 5A, it is assumed that regions 511, 512, 513, and 514 in each of which an object is present are identified through the object recognition module 250.

Referring to FIG. 5A, a query of "how much is this?" is input, and the processor 140 may identify that "this" refers to one object through the text analysis module 120. The processor 140 may identify a region 550-1 having a relatively lower density among the regions 511, 512, 513, and 514 identified through the object recognition module 250 as a region of interest in the image 510.

Figure 5B:
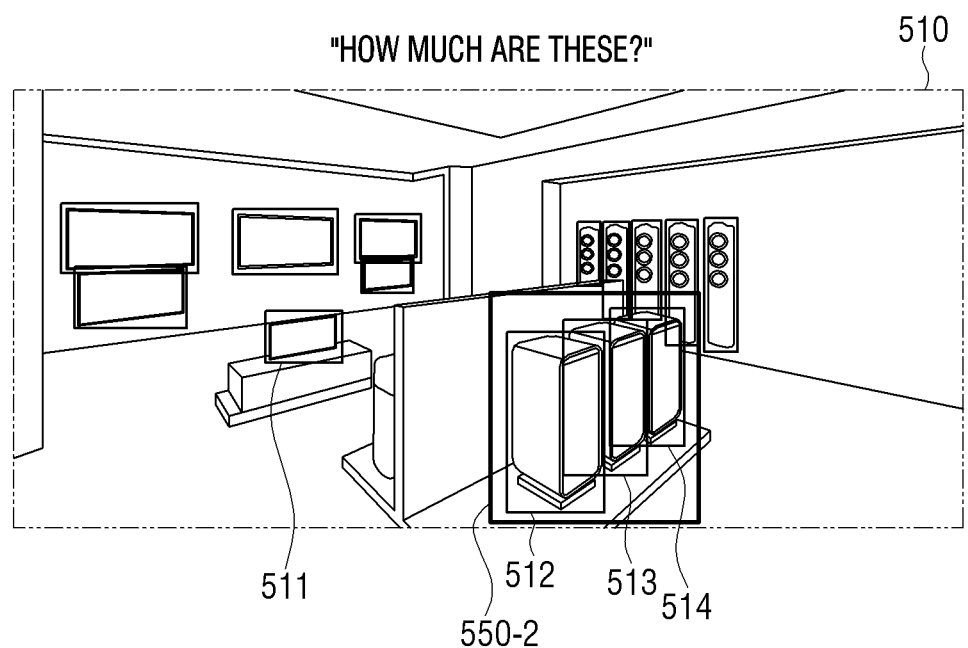

Referring to FIG. 5B, a query "How much are these?" is input, and the processor 140 may determine that "these" refer to a plurality of objects through the text analysis module 220. The processor 140 may identify a region 550-2 having a relatively high density between regions 511, 512, 513, and 514 identified by the object recognition module 250 in the image 510 as the region of interest.

In FIGS. 5A and 5B, the input co-references "this" and "these" are co-references having close distance attribute and the processor 140 identifies a region of interest so that the regions of interests 510-1 and 510-2 are included in a relatively closer region on the image 510 as FIG. 3B.

The memory 130 may store information about a map of a space in which the electronic apparatus 100 is operated and position information of objects present on the map. The information on the map may include information on the structure (shape, size, etc.) of the space in which the electronic apparatus 100 is operated. The position information of the objects present on the map may include information about where each kind of objects exist on the map. For example, the position information of the objects may include information about at which point on the map each of the products present on the map exists. In addition, the position information of the objects may include a product name, type (e.g. refrigerator, bed, smartphone, air purifier, etc.), size, color, price, performance, release date, function, producer, production of each of the products on the map.

If the co-reference includes information on the type of the object, the processor 140 may obtain the position information in which the object of the corresponding kind exists from the position information of the stored objects. The processor 140 may then identify, based on the information about the map, a region of interest that matches the position information obtained from the acquired image.

Figure 6A:
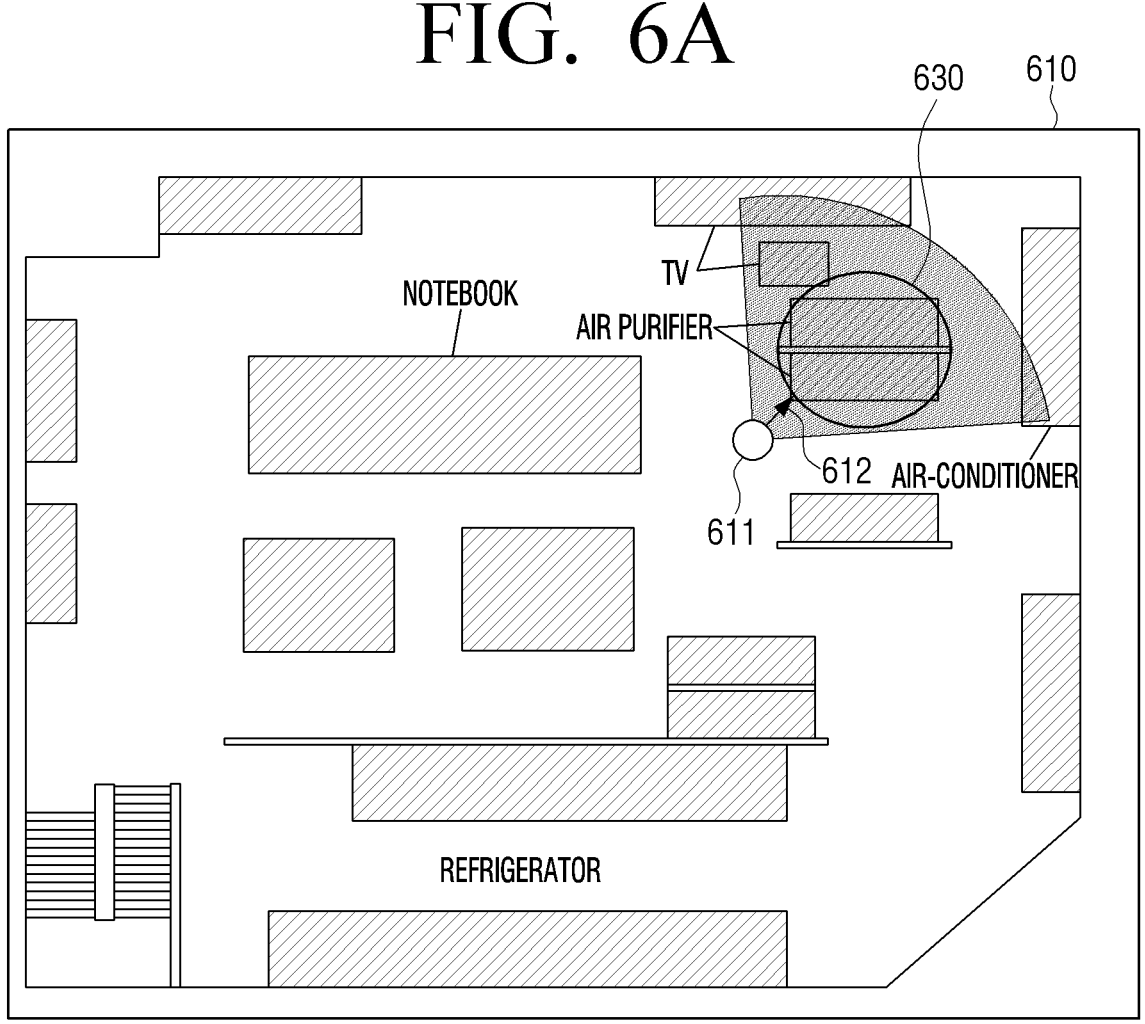
FIGS. 6A and 6B are diagrams illustrating an example embodiment identifying a region of interest according to a corresponding type by the electronic apparatus when the co-reference includes a type of an object according to an embodiment.
Figure 6B:
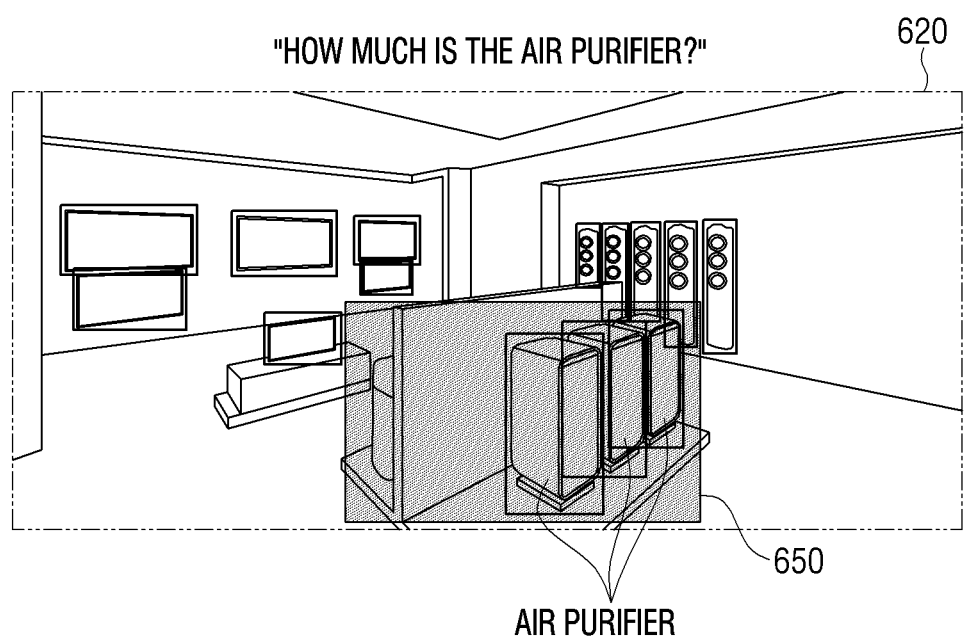

FIGS. 6A and 6B are diagrams illustrating an example embodiment identifying a region of interest according to a corresponding type by the electronic apparatus when the co-reference includes a type of an object according to an embodiment.

FIG. 6A is a diagram illustrating example position information of each type of product illustrated along with the information 610 regarding the map. Referring to FIG. 6A, devices corresponding to an "air purifier" are located on a region 630 on the map 610.

Referring to FIG. 6A, the processor 140 may identify a position 611 of the electronic apparatus 100 on the map and a direction 612 of the camera 120 of the electronic apparatus 100 through a sensor (not shown, for example: acceleration sensor, geomagnetic sensor, light detection and ranging (LiDAR) sensor, inertial sensor, or the like).

FIG. 6B, when the query of "how much is the air purifier?" is input, the processor 140 may identify a type (for example: air purifier) of an object included in the "this air purifier" that is the co-reference through the text analysis module 220.

The processor 140 may identify a region of interest 650 that matches a region 630 of the air purifier in an image 620 that is acquired through the camera 120 using the position 611 and the direction 612 of the camera 120.

In operation S120 (see, e.g., FIG. 2A), the processor 140 may identify an object referred to by the co-reference among the objects included in the region of interest 650 based on a dialogue between the user and the electronic apparatus 100 including the query of the user.

The processor 140 may identify at least one region in which an object is present in the acquired image through the object recognition module 250. For example, the processor 140 may identify one or more regions of which the probability that at least one object may exist is greater than or equal to a threshold through the object recognition module 250.

The processor 140 may identify an object included in a region that is included in the region of interest among the identified regions. In this case, the processor 140 may identify one or more object according to output of the AI model used by the object recognition module 250.

For example, the processor 140 may determine a region included in the region of interest among the identified regions and may recognize one or more objects present in the region of interest by inputting each of the determined regions to the AI model that is trained to output a product name (or a product number, a name of a person, or the like) of an object included in the input image.

The processor 140 may recognize all the objects included in the image acquired through the camera 120 through the object recognition module 250 and then select only an object or objects included in the region of interest.

When an object in the region of interest is recognized (or selected) according to the above-described example embodiments, the processor 140 may acquire information on an object referred to by the co-reference based on the content of dialog including the previous query of the user that is input prior to the corresponding query and a response regarding the previous query, and based on the acquired information about the object, the processor 140 may identify an object referred to by the co-reference, among the objects included in the region of interest. Information about an object may vary, such as, for example, and without limitation, the type, size, color, performance, function, advantages, disadvantages, producer, seller, and place of production of the object, or the like.

The processor 140 may extract information on an object from the content of dialog through the co-reference substitution module 260 and identify whether the extracted information on an object that is matched with at least one object recognized in the region of interest. In this case, the processor 140 may identify the object that is matched with the extracted information, among the objects recognized in the region of interest, as an object referred to by the co-reference.

In this case, the co-reference substitution module 260 may use an AI model trained to extract information about an object related to the co-reference from the dialogue content. In addition, the co-reference substitution module 260 may use the AI model that is trained to output a matching probability between each of the recognized one or more objects and the co-reference, when the information about the extracted object and the data about one or more objects recognized in the ROI are input.

Figure 7:
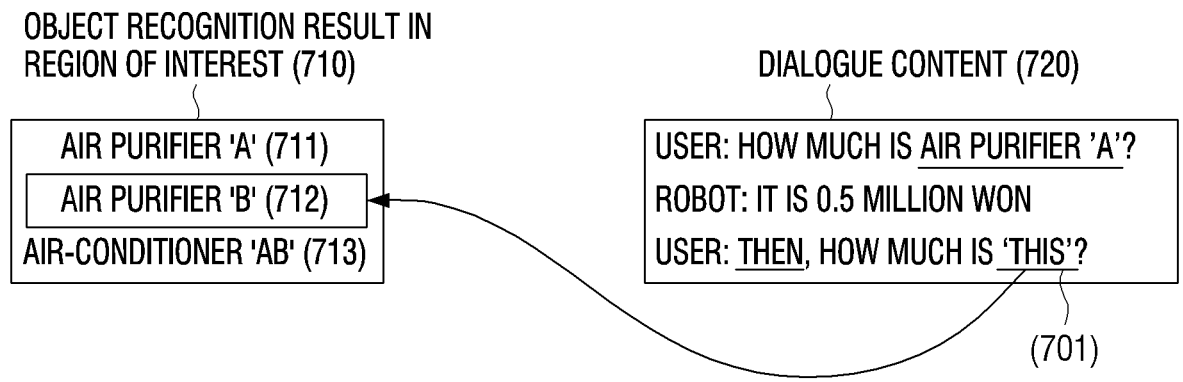
FIG. 7 is a diagram illustrating an example embodiment determining what is an object referred to by the co-reference among the objects in the region of interest using a dialog content between a user and an electronic apparatus according to an embodiment.

FIG. 7 is a diagram illustrating an example embodiment determining what an object referred to by the co-reference is among the objects in the region of interest using a dialog content between a user and an electronic apparatus by an electronic apparatus according to an embodiment.

FIG. 7 illustrates an object recognition result 710 in the region of interest through the object recognition module 250. Referring to FIG. 7, the air purifier 'A' 711, air purifier 'B' 712, and air-conditioner 'AB' 713 are recognized in the region of interest.

Referring to FIG. 7, a dialog content 720 including not only the user's query of "then, how much is this?" but also the user's query ("how much is the air purifier A?") previously input and a reply of the electronic apparatus 100 ("It is 0.5 million Won").

In this case, the processor 140 may identify a type (for example: air purifier) included in the dialogue content. The processor 140 may identify that the price of "A" air purifier has been already responded.

The processor 140 may identify that an object which "this" 701 among the objects in the region of interest is air purifier "B" 712. The processor 140 may identify that the object referred to by the co-reference "this" is air purifier "B" 712, through the co-reference substitution module 260.

Through the operation S120, when the object referred to by the co-reference is identified, the processor 140 may provide information corresponding to the user query among the information (ex: price, size, performance, manufacturer, or the like, of a product) of the object referred to by the co-reference as a response to the query.

For example, the processor 140 may preprocess the text recognized through the voice recognition module 210 according to the co-reference identification result (ex. "this"="air purifier 'B'"), and input the same to the natural language understanding module 211. As a result, the natural language understanding module 211 may understand the user's query as "then, how much is the air purifier 'B'?", and the electronic apparatus 100 may provide the response to inform the price of "air purifier 'B'" using the query-response module 212 and the natural language generation module 213.

The object referred to by the co-reference may not be identified from the region of interest based on information on the object acquired from the dialog content, the processor 140 may output request about additional information.

For example, according to the information about the object obtained from the dialog content related to the query "How much is this?", the type of an object "this" refers to is the air-conditioner, but there is no air-conditioner among the objects included in the region of interest. In this case, the processor 140 may output request of additional information (ex: "I don't know what you are saying. Could you ask me again?" "Do you mean air-conditioner 'A'?", or the like) through a display (not shown) or a speaker (not shown), or the like.

Figure 8:
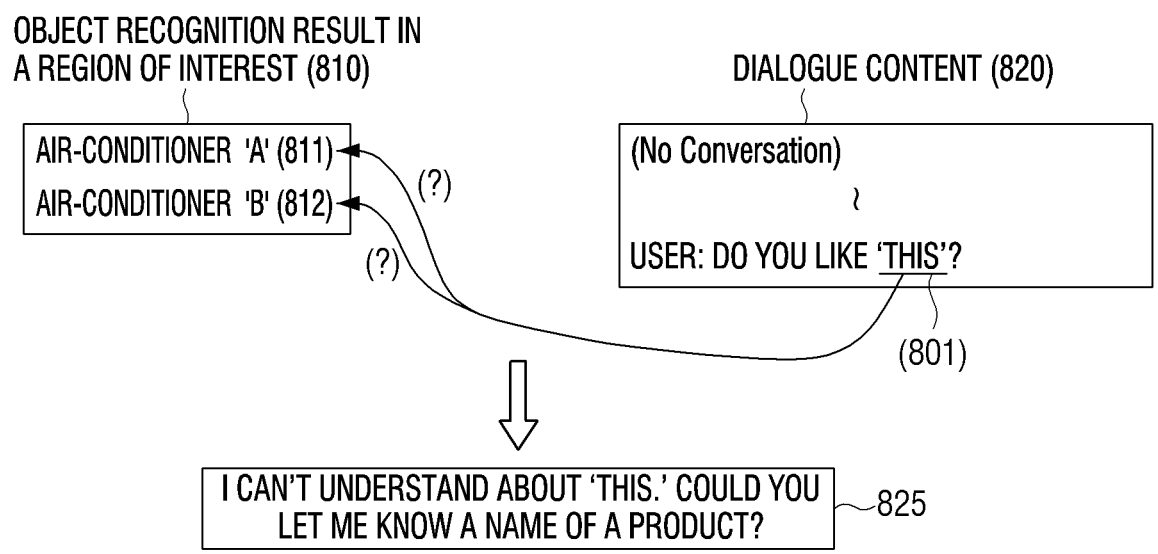
FIG. 8 is a diagram illustrating an example embodiment outputting a request for additional information by the electronic apparatus, when it is identified that an object referred to by the co-reference is not present in the region of interest according to an embodiment.

FIG. 8 is a diagram illustrating an example embodiment outputting a request for additional information by the electronic apparatus, when it is identified that an object referred to by the co-reference is not present in the region of interest according to an embodiment.

In FIG. 8, referring to an object recognition result 810 in the region of interest, the object recognized in the region of interest is air-conditioner 'A' 811 and air-conditioner 'B' 812.

If a query "Do you like 'this'?" is input from a user without any prior dialogue, the processor 140 may not clearly identify an object which the co-reference refers to with only a dialogue content 820.

For example, when the information about the object is not obtained at all with only the dialogue content 820 as shown in FIG. 8, the matching probability for a co-reference "this" 801 for each of the air-conditioner 'A' and the air-conditioner 'B' may be lower than the threshold (if only one object is included in the object recognition result in the region of interest, even if no information is obtained, the co-reference matching probability of the object may be higher than the threshold value. However, if there are two or more objects in the region of interest as shown in FIG. 8, additional information for identifying the object referred to by the co-reference may be required.)

In this case, referring to FIG. 8, a request for additional information such as "I can't understand about 'this'. Could you let me know a name of a product?" 825.

When the user's re-inquiry or reply in response to a request for additional information is input, the processor 140 may obtain additional information about the object from the input re-inquiry or reply, and based on the obtained additional information, the processor 140 may identify an object referred to by the co-reference among the objects included in the region of interest.

In the case of FIG. 8, for example, if the query "how much is the air-conditioner 'A'" is input, the processor 140 may output a reply informing the price of air-conditioner 'A'. In the meantime, as a result of outputting the request for the additional information, if a reply of "the thing on the left" is input, the processor 140 may output a reply informing the price of the air-conditioner that is positioned at a relatively left side on the acquired image (or region of interest) between the air-conditioner 'A' and the air-conditioner 'B.'

Figure 9A:
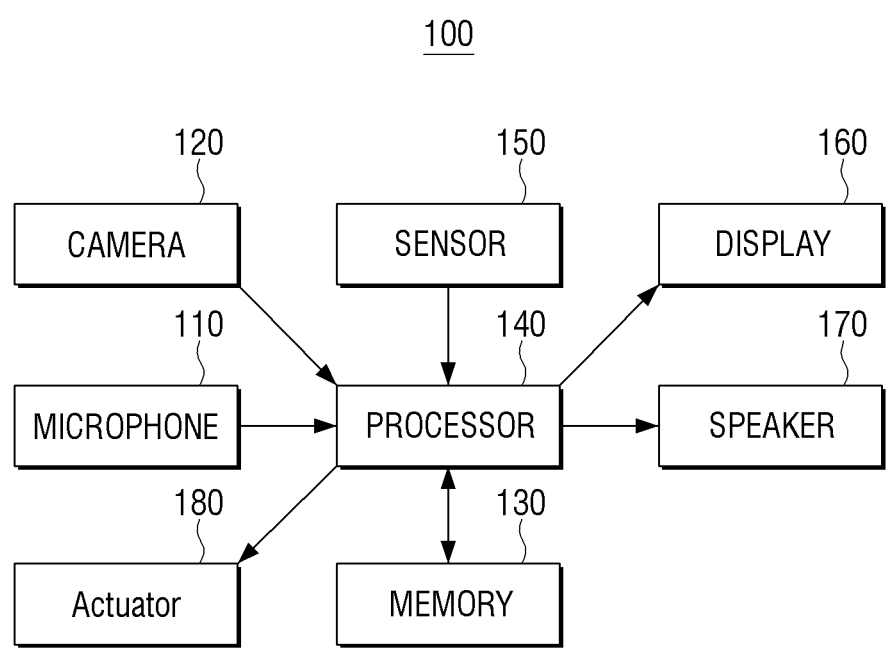
FIGS. 9A and 9B are block diagrams illustrating an example configuration/operation of the electronic apparatus based on hardware and/or software according to various embodiments.
Figure 9B:
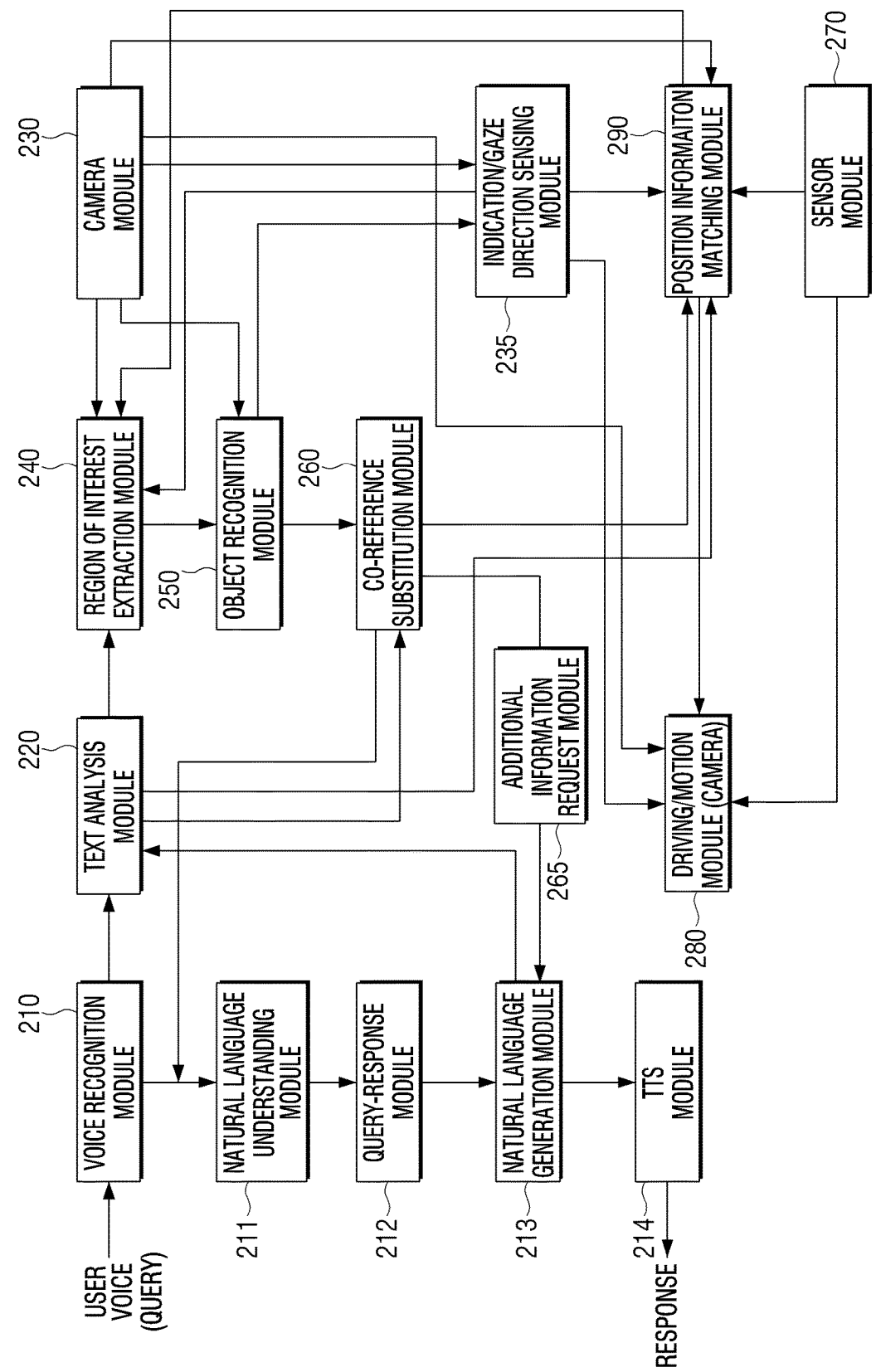

FIGS. 9A and 9B are block diagrams illustrating example configuration/operation of the electronic apparatus based on hardware and/or software according to various embodiments.

Referring to FIG. 9A, the electronic apparatus 100 may further include at least one of a sensor 150, a display 160, a speaker 170, and an actuator 180, in addition to, the microphone 110, the camera 120, the memory 130, and the processor 140.

The sensor 150 may include, for example, and without limitation, an acceleration sensor, a geomagnetic sensor, a LiDAR sensor, an inertial sensor a global positioning system (GPS) sensor, or the like.

In the case where the electronic apparatus 100 includes a moving means, the electronic apparatus 100 may identify a surrounding terrain, object, and obstacle through the camera 120 and/or sensor 150 in the course of driving or performing a motion. In addition, the electronic apparatus 100 may sense a direction in which the electronic apparatus 100 is directed, a direction which the camera 120 is directed, a moving direction, speed, position, or the like, of the electronic apparatus 100 through the sensor 150.

The display 160 is a configuration for the electronic apparatus 100 to visually provide information. The electronic apparatus 100 may include one or more display 160, and may display a reply to the input user query through the display 160.

The display 160 may, for example, and without limitation, be implemented as a liquid crystal display (LCD), a plasma display panel (PDP), organic light emitting diodes (OLED), transparent OLED (TOLED), micro LED, or the like.

The display 160 may be implemented as a touch screen capable of sensing a touch operation of a user or may be implemented as a flexible display that may be folded or bent.

The speaker 170 is a configuration for the electronic apparatus 100 to provide information audibly. The electronic apparatus 100 may include one or more speaker 170, and may output the reply to the input user's query as an audio signal through the speaker 170.

Though not illustrated through FIG. 9A, the electronic apparatus 100 may include an earphone/headphone terminal, and may output an audio signal corresponding to the response through the earphone/headphone terminal.

The actuator is a configuration for driving and/or performing a motion of the electronic apparatus 100. The electronic apparatus 100 may separately include an actuator for driving and an actuator for a motion, but the actuator may control a moving means of the electronic apparatus 100 and/or physical movement of at least a part of the electronic apparatus 100 according to a control of the processor 140.

Though not illustrated, the electronic apparatus 100 may additionally include a communicator including various communication circuitry for performing communication with an external device, a user inputter including various input circuitry for receiving a user input using another method other than voice, or the like.

The electronic apparatus 100 having a hardware structure as FIG. 9A may include modules as illustrated, for example, in FIG. 9B.

Referring to FIG. 9B, the electronic apparatus 100 may further include a TTS module (e.g., including processing circuitry and/or executable program elements) 214 for outputting a reply (text) that is generated through the natural language generation module 213 to an audio-signal format, in addition to the modules shown and described with reference to FIG. 2B. In addition, the electronic apparatus 100 may further include an additional information request module (e.g., including processing circuitry and/or executable program elements) 265 for generating a request for additional information, when an object referred to by the co-reference is not identified through the co-reference substitution module 260.

In addition, the electronic apparatus 100 may further include at least one of an indication/gaze direction sensing module (e.g., including processing circuitry and/or executable program elements) 235 for determining an indication/gaze direction of a user, a sensor module (e.g., including various sensors, processing circuitry and/or executable program elements) 270 for controlling the sensor 150 and transmitting the sensing data of the sensor 150 to another module, a driving/motion module (e.g., including processing circuitry and/or executable program elements) 280 for controlling a physical motion of at least a part of the electronic apparatus, and a position information matching module (e.g., including processing circuitry and/or executable program elements) 290 for comparing the prestored position information of at least one object with the position of the electronic apparatus 100.

The electronic apparatus 100 as in FIG. 9A and/or FIG. 9B may be operating according to various embodiments in addition to the embodiments of FIGS. 2A and 2B, including S110 and S120. Various additional embodiments will be described in greater detail below through FIGS. 10A, 10B, 10C, 11, and 12.

As an example embodiment, the camera 120 may be included on the electronic apparatus 100 be configured to be rotatable, and the processor 140 may determine a direction of user's indication or gaze using the indication/gaze direction sensing module 235.

In this case, the indication/gaze direction sensing module 235 may determine a direction of user's indication or gaze through an image acquired from the camera 120.

Figure 10A:
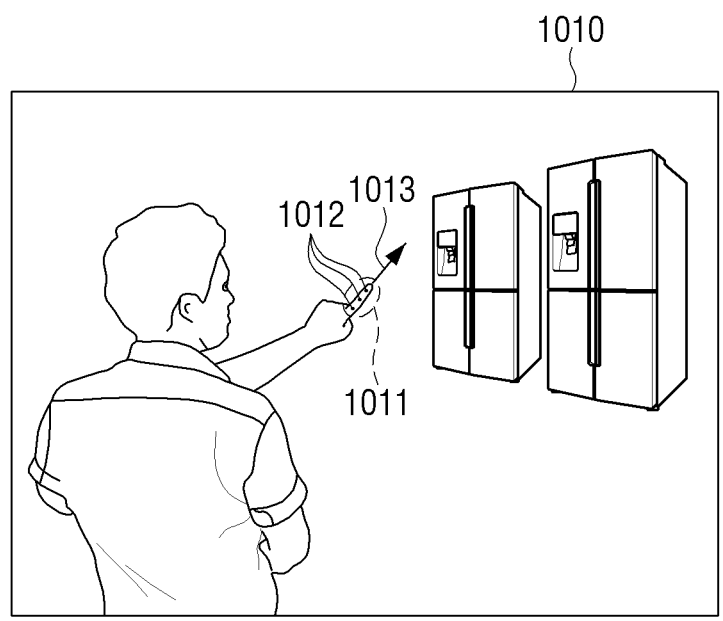
FIGS. 10A, 10B, and 10C are diagrams illustrating an example embodiment identifying a user's indication/gaze direction for an object referred to by the co-reference and adjusting a direction of a camera according to an identified direction by the electronic apparatus according to an embodiment.

FIG. 10A is a diagram illustrating an example embodiment determining an indication direction of the user for an object referred to by the co-reference by the electronic apparatus according to an embodiment.

Referring to FIG. 10A, the processor 140 may recognize a user's finger 1011 using an image (ex. RGB image) 1010 acquired through the camera 120. The processor 140 may use the object recognition module 250 connected to the indication/gaze direction sensing module 235.

The processor 140 may identify distance information of each of three points 1012 positioned on the finger 1011, through a depth image acquired through the camera 120.

The processor 140 may determine a direction 1013 of the user's finger 1011 using distance information of each of the three points 1012.

Figure 10B:
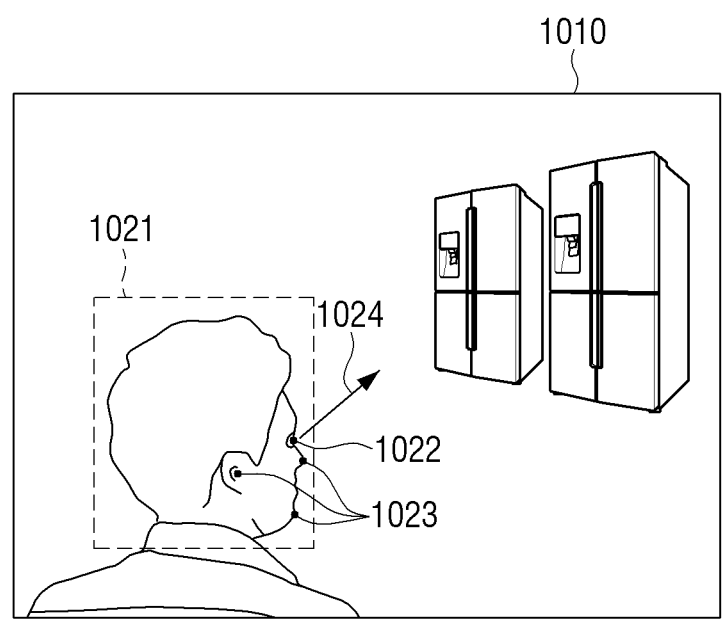

FIG. 10B is a diagram illustrating an example embodiment determining a gaze direction of a user for an object referred to by the co-reference by the electronic apparatus according to an embodiment.

Referring to FIG. 10B, the processor 140 may recognize a head 1021 of the user using an image (for example, an RGB image) 1010 obtained through the camera 120. In addition, the processor 140 may identify a location 1022 where the eyes are located in the head 1021, and may also identify points 1023 related to the direction of the face such as nose, ear, chin, or the like. In this case, the processor 140 may use the object recognition module 250 connected to the indication/gaze direction sensing module 235 or a separate AI model trained to detect the gaze direction 1024 from the face image.

The processor 140 may determine a direction 1024 of a user's gaze using identified points 1022 and 1023.

FIG. 10A and FIG. 10B illustrate a depth image obtained through a depth camera or an RGB-D camera, but an embodiment in which the electronic apparatus 100 determines the indication/gaze direction according to a difference between a plurality of images acquired through a stereo camera is also possible. The electronic apparatus 100 may determine the gaze/indication direction of the user by analyzing the brightness and the shadow in the image using a single camera that provides only the RGB image.

The processor 140 may adjust a capturing direction of the camera 120 based on the determined indication/gaze direction, and identify a region of interest corresponding to the co-reference that is acquired through the adjusted camera. The processor 140 may perform the operation of S110 for the image acquired through the adjusted camera.

Figure 10C:
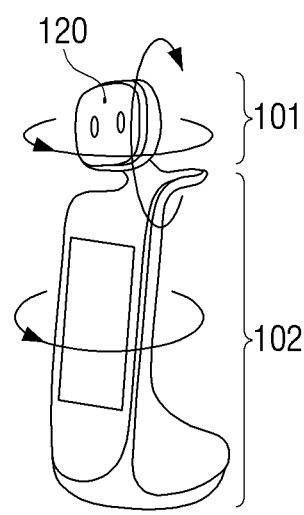

FIG. 10C is a diagram illustrating an example embodiment adjusting a direction of the camera 120 according to an indication/gaze direction of a user according to an embodiment.

Referring to FIG. 10C, the electronic apparatus 100 which may, for example, be a robot may include a head 101 including the camera 120 and a body 102 including a moving means (for example: wheels).

Referring to FIG. 10C, the head 101 may rotate, for example, in a direction parallel to the ground and/or a direction perpendicular with the ground, and a direction of the camera 120 may be adjusted.

The body 102 may rotate, for example, in a direction parallel to the ground using a mobile means. As a result, a moving direction of the electronic apparatus 100 and a direction of the camera 120 may be adjusted.

The processor 140 of the electronic apparatus 100 that is implemented as FIG. 10C may adjust a direction of the camera 120 by controlling the head 101 and/or the body 102 through the driving/motion module 280.

In the operation S110 (see, e.g., FIG. 2B), the processor 140 may identify a region of interest using the indication/gaze direction that is determined through the indication/gaze direction sensing module 235.

Figure 11:
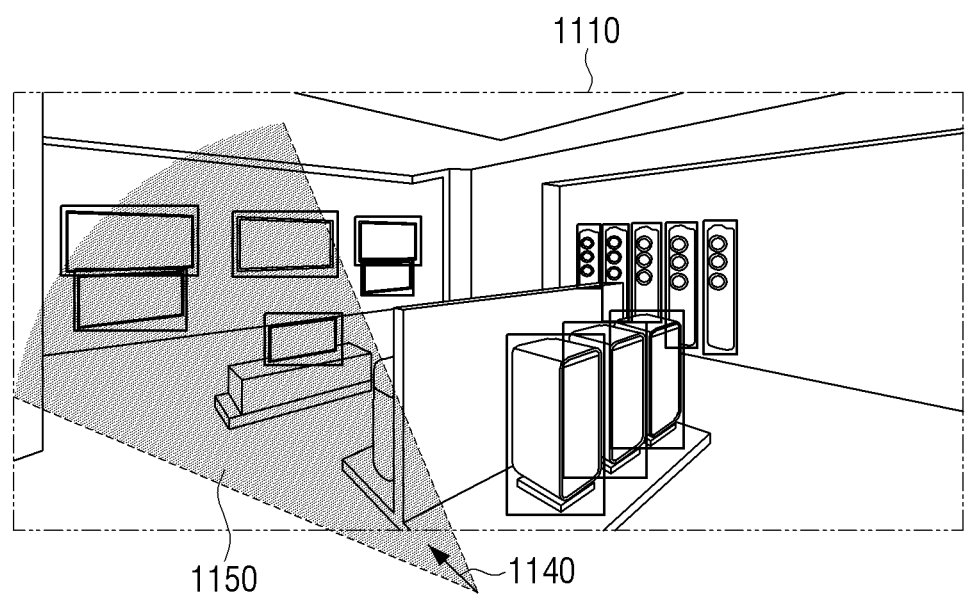
FIG. 11 is a diagram illustrating an example embodiment identifying a region of interest according to a user's indication/gaze direction by the electronic apparatus according to an embodiment.

FIG. 11 is a diagram illustrating an example embodiment identifying a region of interest according to a user's indication/gaze direction by the electronic apparatus according to an embodiment.

Referring to FIG. 11, the processor 140 may identify a region 1150 that is within a predetermined scope (for example: a predetermined angle range with respect to the indication/gaze direction) from the indication/gaze direction 1140 among the image 1110 obtained through the camera 120 as a region of interest. The processor 140 may identify an object referred to by the co-reference from the region of interest 1150.

When the memory 130 of the electronic apparatus 100 including the moving means stores information on a map of a space in which the electronic apparatus 100 is operated, if an obstacle is identified in the image acquired through the camera 120, the processor 140 may control the moving means to move to a point where an image of the determined direction may be obtained without an obstacle, using information about the map and information about the identified obstacle.

Figure 12:
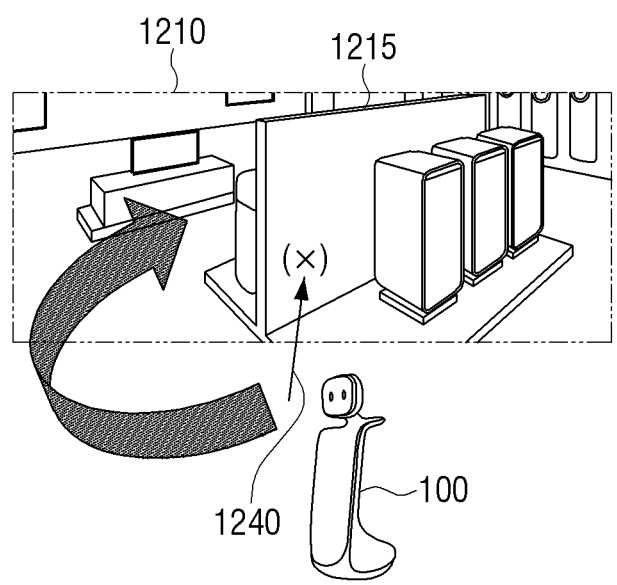
FIG. 12 is a diagram illustrating an example embodiment in which, when an obstacle is found in an image acquired through a camera, the electronic apparatus moves in consideration of the information on a map and the user's indication/gaze direction according to an embodiment.

FIG. 12 is a diagram illustrating an embodiment in which, when an obstacle is found in an image acquired through a camera, the electronic apparatus moves in consideration of the information on a map and the user's indication/gaze direction according to an embodiment.

In FIG. 12, it is assumed that the processor 140 adjusts a direction of the camera 120 according to an indication/gaze direction 1240 and then obtains an image 1210 through the camera 120.

Referring to FIG. 12, the processor 140 may recognize an obstacle 1215 through the object recognition module 250. Referring to FIG. 12, no object is recognized in the region of interest according to the indication/gaze direction on the image 1210 and thus, the processor 140 may control the moving means to move to a position capable of capturing objects located in the direction 1240 by avoiding an obstacle.

The processor 140 may acquire information on the size or shape of the obstacle that is recognized through the object recognition module 250, and control the moving means to move at a path in which a surrounding topography is bumped, based on the information on the obstacle and/or map.

In the situation where the memory 130 of the electronic apparatus 100 including the moving means stores the information on the map of the space in which the electronic apparatus 100 is operated and the position information of the objects present on the map, if the object referred to by the co-reference is not identified from the region of interest based on the information about the object acquired accordingly, the processor 140 may not output a request for additional information, and match the position on the map of the electronic apparatus 100 with the acquired information about the object.

The processor 140 may identify at least one object existing around a point where the electronic apparatus 100 is positioned on the map, based on the stored position information. At this time, the processor 140 may identify the position on the map of the electronic apparatus 100 using the sensing data received through the sensor 150 and the sensor module 270, and identify at least one object having position information matched to a periphery (e.g., in a predetermined range from the position on the map of the electronic apparatus 100) of the electronic apparatus 100 among the stored position information of the objects.

When an object related to acquired information on the object does not exist among the at least one object present in the periphery, the processor 140 may control the moving means to move to a point on the map in which the object related to the acquired information on the object is present, based on the stored position information.

For example, while the types of objects present in the vicinity of the electronic apparatus 100 are only air-conditioner and TV, the type of object obtained through the dialogue contents is an air purifier, the processor 140 may control the driving/motion module 280 to move to the point where the air purifiers are located on the map using the position information of the air purifier in the stored position information of the objects. In this case, when the electronic apparatus 100 arrives at the point where the air purifiers are located, the processor 140 may control the additional information request module 265 to request additional information.

Though not illustrated in FIG. 9B, the electronic apparatus 100 may further include the co-reference audio analysis model (e.g., including processing circuitry and/or executable program elements).

The processor 140 may extract only an audio signal of the co-reference among the input user voice (audio signal) through the co-reference audio analysis model and then identify/adjust a region of interest according to the feature of the audio signal. The feature of the audio signal may include various feature information according to a result of applying a domain conversion for an audio signal, in addition to the time length and sound height of the audio signal.

For example, when the co-reference of "that" is included in the user query, the longer the time length of the audio signal corresponding to "that" is, the processor 140 may identify the region of interest as a region that is farther from the image.

The higher the similarity between the feature information of the audio signal corresponding to "that" and the feature information of a comparatively strong sound (for example: fortis), the processor 140 may identify the region of interest as a region that is farther from the image.

The co-reference substitution module 260 may determine an object referred to by the co-reference with only the dialogue content acquired from the text analysis module 220 regardless of the object recognition result of the object recognition module 250. For this purpose, the co-reference substitution module 260 may include the dialogue-based object recognition module that is designed/trained to extract an object referred to by the co-reference from the dialogue content including the co-reference.

FIGS. 13, 14, 15 and 16, will be used to describe an example controlling method of the electronic apparatus according to the disclosure in greater detail.

Figure 13:
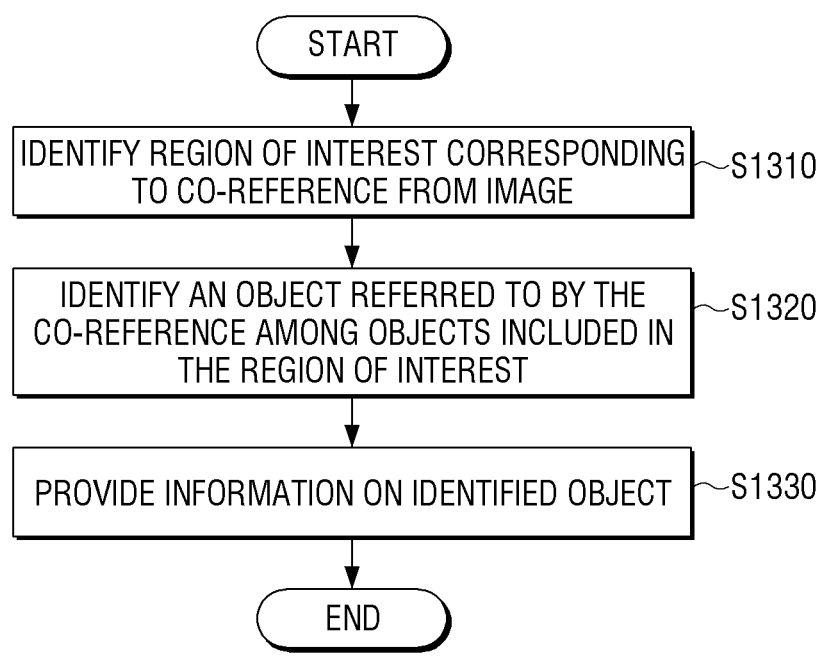
FIG. 13 is a flowchart illustrating an example method of controlling an electronic apparatus according to an embodiment.

FIG. 13 is a flowchart illustrating an example method of controlling an electronic apparatus according to an embodiment.

Referring to FIG. 13, the method may identify a region of interest corresponding to the co-reference from the image acquired through a camera when the co-reference is included in the input user query in operation S1310.

According to the distance attribute of the co-reference, a different region in the acquired image may be identified as a region of interest.

As an example, when the co-reference is a co-reference referring to an object at a close distance such as "this" and "these," a region that is positioned at a relatively closer distance in the acquired image may be identified as a region of interest, and when the co-reference is a co-reference referring to an object at a far distance such as "that" and "those," a region that is positioned at a relatively distant distance in the acquired image may be identified as a region of interest.

For example, if a first co-reference is included in a query and a second co-reference is included in a query input after a corresponding query or a corresponding query, the relative positional relation between the first object and the second object referred to by the second co-reference may be determined and a region in which the first object has a relative position relation with respect to the identified one region may be identified as a region of interest corresponding to the second co-reference, based on the distance attribute of the first co-reference and the second co-reference after the first object referred to by the first co-reference is identified in one region of the acquired image.

The method may identify at least one region in which each one object is present in the acquired image, and identify a region of interest corresponding to the co-reference based on density of the identified region in the acquired image.

For example, when the co-reference is a co-reference referring to a singular object such as "this" or "that", a region having a relatively low density of the identified region in the acquired image may be identified as a region of interest, and if the co-reference is a co-reference that refers to a plurality of objects, such as "these" and "those," a region of relatively high density in the region identified in the acquired image may be identified as a region of interest.

When the information on a map of the space where the electronic apparatus is operated and position information on the objects present on the map are stored in the electronic apparatus, the controlling method may identify a region of interest using the stored position information of the objects.

For example, when the co-reference includes information on the type of the object, position information in which the object of the type exists may be obtained from the stored position information of the objects. In this case, the region of interest that matches the position information acquired from the acquired image may be identified based on the information on the map.

The method may identify an object referred to by the co-reference among at least one object included in the identified region of interest in operation S1320.

At least one region in which an object is present in the acquired image may be identified, and an object included in a region included in the region of interest may be identified, among the identified region.

Based on the dialogue content including the input query, a previous query of the user input prior to the corresponding query, and a reply to the previous query, the information on the object referred to by the co-reference may be acquired, and based on the acquired information on the object, an object referred to by the co-reference among the object included in a region included in the region of interest may be identified.

When an object referred to by the co-reference is not identified from the region of interest based on the acquired information on an object based on the dialogue content, a request for additional information may be output.

When a user's re-inquiry or reply is input according to the output request, additional information on an object may be acquired from the input re-inquiry and response, and may identify an object referred to by the co-reference among the object included in a region included in the region of interest based on the acquired additional information.

Information on an object that is identified as an object which refers to the co-reference may be provided as a reply in operation S1330. To be specific, the co-reference may be substituted to the identified object from the user query, and a reply to the query in which the co-reference is substituted to the identified object may be output visually or audibly.

Figure 14:
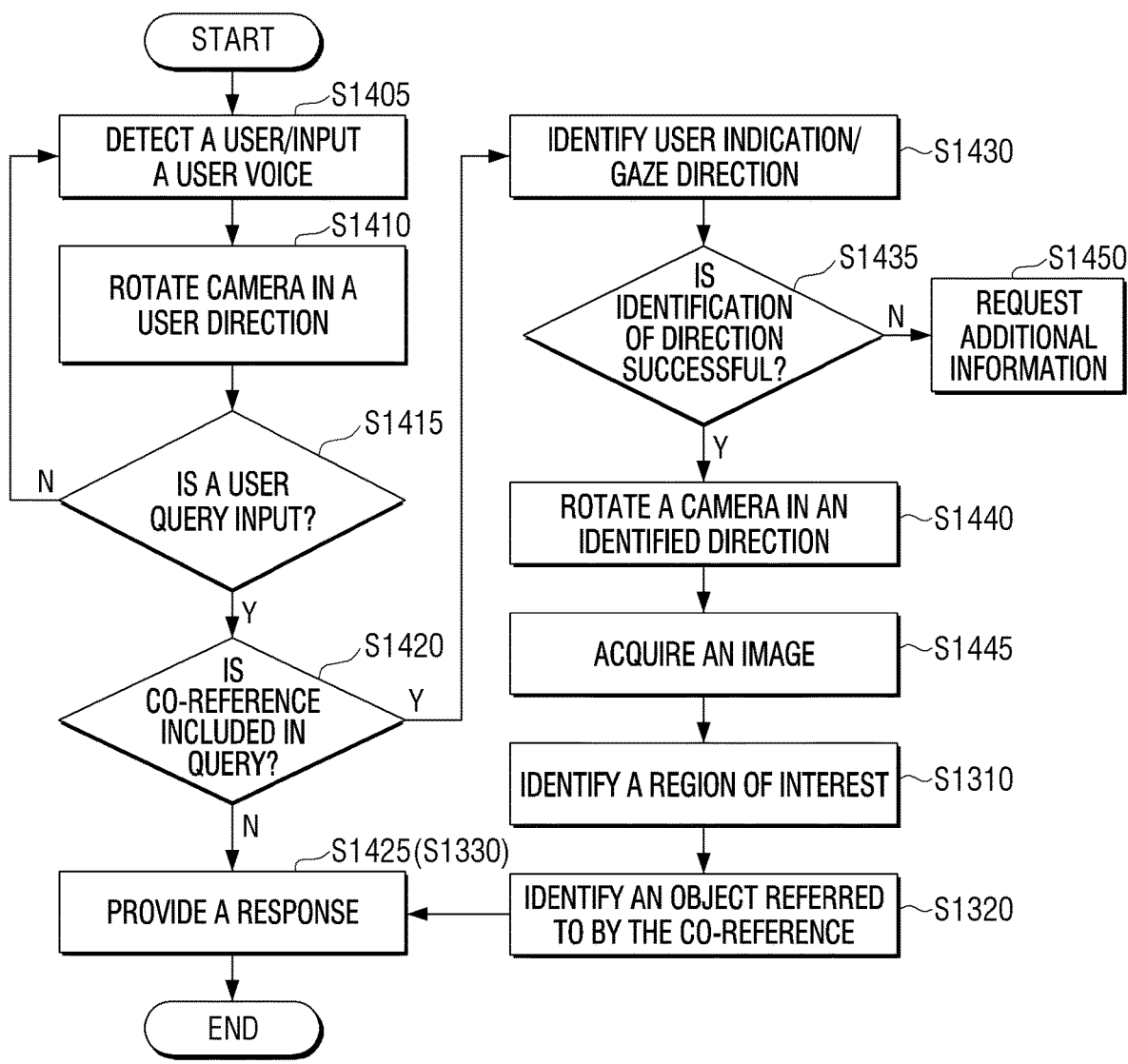
FIG. 14 is flowchart illustrating an example algorithm of a process performed prior to beginning the process of FIG. 13 according to an embodiment.

FIG. 14 is a flowchart illustrating an example algorithm of a process performed prior to beginning the process of FIG. 13 according to an embodiment.

Referring to FIG. 14, when the electronic apparatus 100 detects the user by recognizing the user included in the image acquired through the camera or when the user's voice is input in operation S1405, the electronic apparatus 100 may rotate the camera in a user's direction in operation S1410. In this case, the electronic apparatus 100 may approach a predetermined distance from the user. In this case, a guide such as "What can I help you?" may be output visually and audibly. S1410 may be performed according to a predetermined event such as, for example, and without limitation, an input of pressing a specific button of an electronic apparatus, an input of a near field communication (NFC) tag of specific information, or the like.

When the user's query is input in operation S1415-Y, if the query does not include a co-reference in operation S1420-N, a response to the user's query may be provided in operation S1425. For example, when the query "How much is air-conditioner 'A'?" is input, price information for air-conditioner 'A' may be obtained from a database including information on a plurality of products, and a response that "air-conditioner 'A' is 1.2 million Won" may be provided.

However, if the input user query includes the co-references such as "this" and "those," or the like in operation S1420-Y, the controlling method may identify a direction of user's indication or gaze using an image acquired through the camera in operation S1430.

When the user's indication/gaze direction is not identified in operation S1435-N, request of additional information such as "I can't understand what you mean. Could you tell me a product name?" may be output.

When the user's indication/gaze direction is identified in operation 1435-Y, an image may be acquired in operation S1445 by rotating a camera in an identified direction in operation S1440.

The operations S1310, S1320 and S1330 of FIG. 13 may be performed.

The process prior to performing the process of FIG. 13 is not limited to the case of FIG. 14, and an order of the processes of FIG. 14 may be changed or at least a part of the processes of FIG. 14 may be performed.

Figure 15:
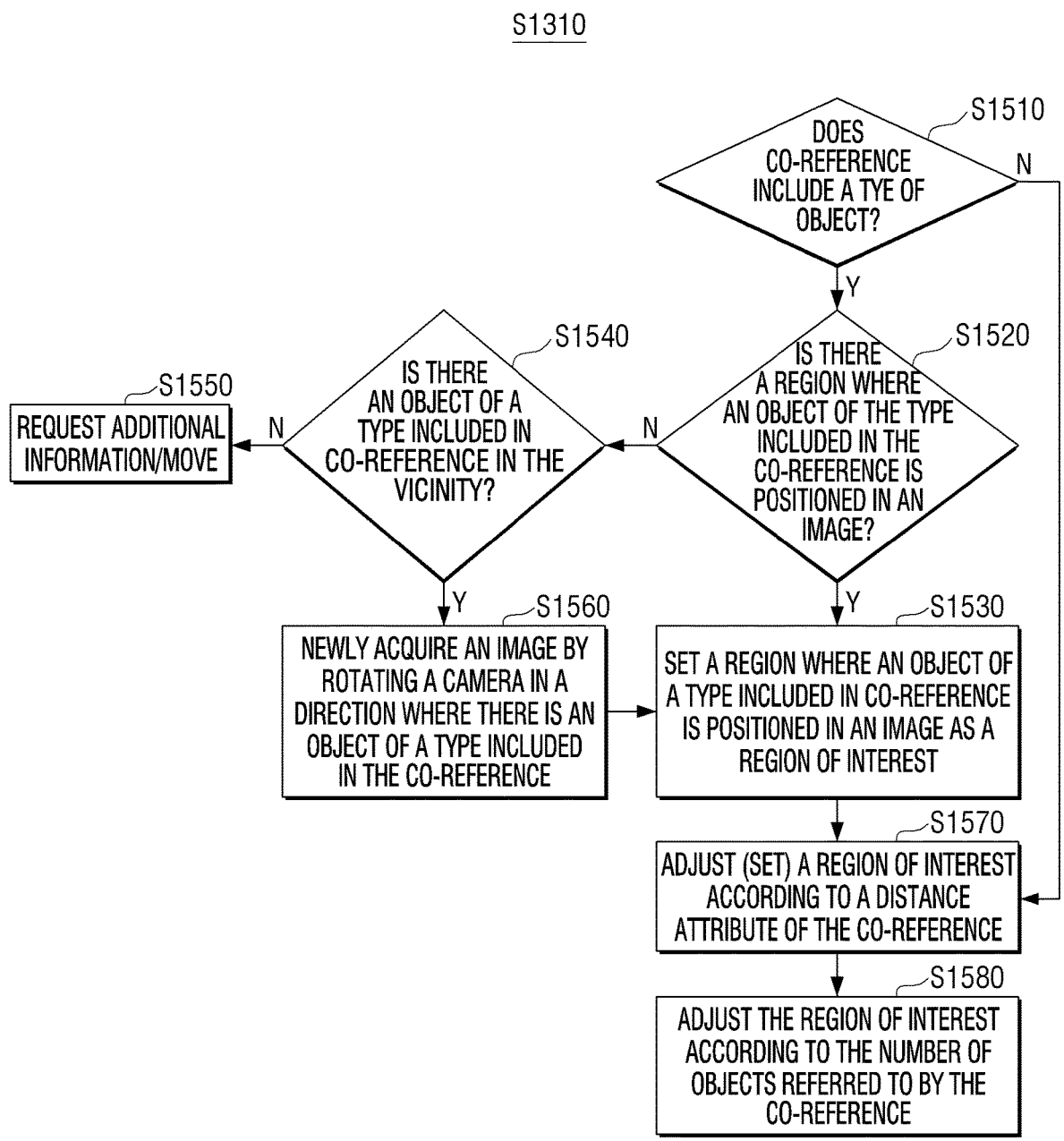
FIG. 15 is flowchart illustrating an example algorithm identifying a region of interest by an example controlling method according to an embodiment.

FIG. 15 is a flowchart illustrating an example algorithm identifying a region of interest by a controlling method in S1310.

Referring to FIG. 15, it may be identified that the co-reference includes the type of objects (such as air-conditioner and air purifier) such as "this air-conditioner" and "those air purifiers" in operation S1510.

If the co-reference includes a type of an object in operation S1510-Y, whether the image acquired through the camera includes a region where an object included in the co-reference is positioned may be determined in operation S1520.

For example, by comparing the sensing data received through the LiDAR sensor or the camera may be compared with the stored information on a map and a position of the electronic apparatus and a direction of a camera for capturing an image may be identified. By using the position information of the objects of each type included in the position information of the objects on the stored map, it may be identified whether an object of a type included in the co-reference is present in an image.

If there is an object of a type included in the co-reference is present in an image in operation S1520-Y, a region where the object of the type included in the co-reference in an image may be set to a region of interest in operation S1530.

When an object of the type included in the co-reference is not present in an electronic image in operation S1520-N, it may be determined that an object of the type included in the co-reference is presented in the vicinity of the electronic apparatus in operation S1540.

For example, by comparing the information on the position of each type of objects and the position of the electronic apparatus, it may be determined that there is any object of the type included in the co-reference in the vicinity of the electronic apparatus.

If there is no object of the type included in the co-reference is present in the vicinity of the electronic apparatus in operation S1540-N, additional information may be requested to a user, or a position in which the object of the corresponding type is exist on the map can be moved to in step S1550.

If there is an object of a type included in the co-reference is present in the vicinity of the electronic apparatus in step S1540-Y, an image may be newly acquired by rotating a camera in a direction where the object of the type is present in operation S1560. From the image newly acquired, a region in which an object of the type included in the co-reference is positioned may be set as a region of interest in operation S1530.

The region of interest may be adjusted (or set) according to the distance attribute of the co-reference in operation S1570. For example, when the co-reference refers to an object of a close distance such as "this", the region of interest may be adjusted to a region that is closer than a region that is set in operation S1530, and when the co-reference refers to an object of a far distance such as "that", the region of interest may be adjusted to a region that is farther than a region that is set in operation S1530.

The region of interest may be adjusted according to the number of objects referred to by the co-reference in operation S1580. For example, after determining the density of the objects of which existence is identified in the image by regions in the image, if the co-reference is singular, a region of which density is relatively low among the regions of interest of S1570 may be set to a final region of interest, and when there are a plurality of co-references, a region of which density is relatively high among the region of interest set in S1570 may be set to a final region of interest.

Referring to FIG. 15, when the co-reference does not include a type of an object in operation S1510-N, the region of interest may be set through the step S1570 immediately, and the region of interest may be adjusted through S1580.

The embodiment of FIG. 15 is an example of S1310, and at least one operation of FIG. 15 may be modified/deleted using the technical common sense by those skilled in the art or a new operation may be added.

For example, FIG. 15 is only an example, and the order of each step included in FIG. 15 may be changed, or only some of the steps included in FIG. 15 may be performed in step S1310. In addition, although not shown in FIG. 15, a step of setting (adjusting) the region of interest as a region corresponding to the indication/gaze direction of the user in the image may be further added.

Figure 16:
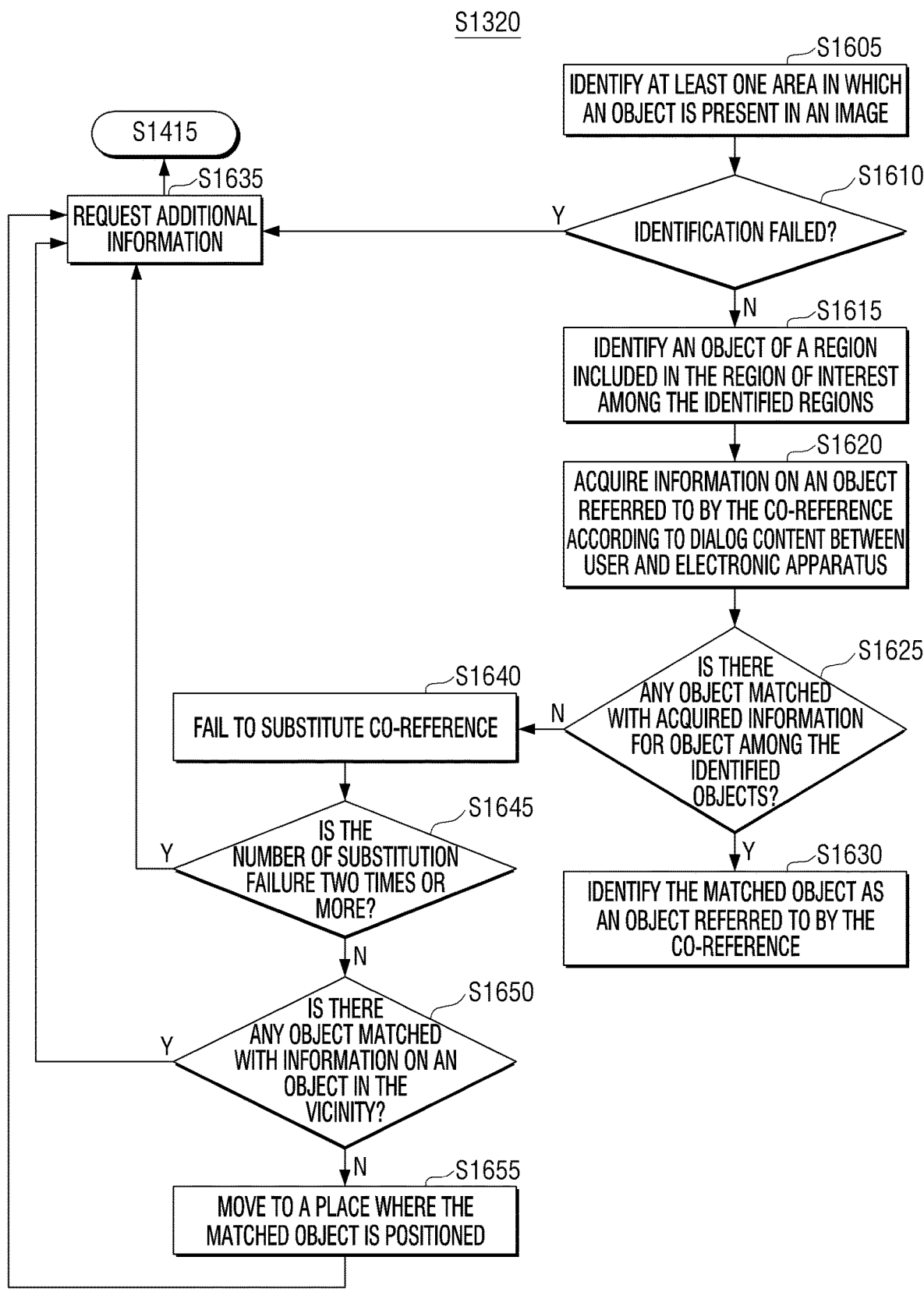
FIG. 16 is flowchart illustrating an example algorithm identifying an object referred to by a co-reference in a region of interest by an example controlling method according to an embodiment.

FIG. 16 is a flowchart illustrating an example algorithm identifying an object referred to by a co-reference in a region of interest in operation S1320 according to an embodiment.

Referring to FIG. 16, the method may identify at least one region where an object is present from an image (an image of which a region of interest is identical with the identified image) that is acquired through the camera in operation S1605. When an image is input, an AI model that is trained to identify a region of which probability that there is an object in an image is greater than or equal to a threshold value may be used.

If there is no region in which an object is present in operation S1610-Y, additional information may be requested to a user in operation S1635, and the operation may return to S1415 of FIG. 14.

If one or more of the regions in which an object is present is identified in an image in operation S1610-N, the object of the region included in the region of interest among the identified regions may be identified in operation S1615. By inputting the identified region to the AI model for object recognition, a product name, or the like, of an object included in each of the identified region may be recognized.

According to a dialogue content between the user and the electronic apparatus including an input user query, information on the object referred to by the co-reference may be acquired in operation S1620.

It may be identified whether there is an object matching the acquired information on the object among the identified objects in the region of interest in operation S1625.

If there is a matched object in operation S1625-Y, the object may be identified as an object referred to by the co-reference in operation S1630. In this case, a response including information on the object that is identified as an object referred to by the co-reference may be provided.

If there is no matched object in operation S1625-N, it may be recognized that the co-reference substitution is failed in operation S1640, and it may be determined that the number of the co-reference failure times is two or more in operation S1645.

If the number of co-reference substitution failure is two or more in operation S1645-Y, additional information may be requested to a user in operation S1635, and the operation may return to S1415.

If the co-reference substitution failure number is one time in operation S1645-N, it may be determined that there is an object that is matched with the information on the object in the vicinity of the electronic apparatus in operation S1650.

If there is no matching object in the vicinity in operation S1650-N, additional information may be requested after moving to the place where the matching object is on the map in operation S1655, and when there is a matching object in the vicinity in operation S1650-Y, additional information may be requested immediately in operation S1635.

The embodiment of FIG. 16 is merely an example embodiment of S1320, and at least one operation of FIG. 16 may be modified/deleted using the technical common sense by those skilled in the art or a new operation may be added.

The method of controlling the electronic apparatus as described above through FIGS. 13, 14, 15 and 16 may be illustrated through FIGS. 2A, 2B, 9A, and 9B and performed through the electronic apparatus 100.

The method of controlling the electronic apparatus as described through FIGS. 13, 14, 15 and 16 may be performed through a system that includes one or more external device and the electronic apparatus 100.

The electronic apparatus according to an embodiment may operate as an artificial intelligence device that can properly respond to customers instead of a human guide, as a result of reproducing a mechanism for intuitively understanding the co-reference uttered by a counterpart in consideration of the surrounding situation technically and in a step-by-step manner.

For example, since the electronic apparatus may determine the object referred to by the co-reference in consideration of the attributes of the co-reference itself, as well as the entire dialogue content, the user's utterance including the co-reference may be understood more accurately and rapidly.

The various example embodiments described above may be implemented in a recordable medium which is readable by computer or a device similar to computer using software, hardware, or the combination of software and hardware.

By hardware implementation, the embodiments of the disclosure may be implemented using, for example, and without limitation, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electric units for performing other functions, or the like.

In some cases, embodiments described herein may be implemented by the processor 140 itself. According to a software implementation, embodiments such as the procedures and functions described herein may be implemented with separate software modules. Each of the above-described software modules may perform one or more of the functions and operations described herein.

The computer instructions for performing the processing operations of the electronic apparatus 100 according to the various embodiments described above may be stored in a non-transitory computer-readable medium. The computer instructions stored in this non-transitory computer-readable medium may cause the above-described specific device to perform the processing operations in the electronic apparatus 100 according to the above-described various example embodiments when executed by the processor of the device.

The non-transitory computer readable medium may refer, for example, to a medium that stores data semi-permanently, and is readable by an apparatus. For example, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like.

The foregoing example embodiments and advantages are merely examples and are not to be understood as limiting the disclosure. The present disclosure may be readily applied to other types of devices. The description of the embodiments of the disclosure is intended to be illustrative, and not to limit the scope of the claims, and many alternatives, modifications, and variations will be apparent to those skilled in the art.

What is claimed is:

1. An electronic apparatus comprising:
a microphone;
a camera;
a memory configured to store at least one instruction; and
at least one processor connected to the microphone, the camera, and the memory and configured to control the electronic apparatus,
wherein the processor, by executing the at least one instruction, is configured to control the electronic apparatus to obtain a text corresponding to a voice that is input through the microphone, and provide a reply to a first query based on the first query being included in the obtained text, and
wherein the processor is further configured to control the electronic apparatus to:
identify a region of interest corresponding to a first co-reference in an image obtained through the camera based on the first co-reference being included in the first query,
identify first object referred to by the first co-reference, among at least one object included in the identified region of interest based on a dialogue content that includes the first query,
based on the first co-reference being included in the first query and a second co-reference being included in the first query or a second query which is input after the first query:
based on the first object referred to by the first co-reference included in the first query being identified in one region of the obtained image, determine a relative position relation between the first object and a second object referred to by the second co-reference based on a distance attribute of the first co-reference and the second co-reference,
identify a region that has the relative position relation with respect to the one region in the obtained image as a region of interest corresponding to the second co-reference, and
provide information on the identified at least one of the first object or the second object as the reply.

2. The electronic apparatus of claim 1, wherein the processor is further configured to control the electronic apparatus to:
identify a region positioned at a relatively close distance in the obtained image as the region of interest based on the first co-reference being a co-reference referring to an object at a close distance, and identify a region positioned at a relatively far distance in the obtained image as the region of interest based on the first co-reference being a co-reference referring to an object at a far distance.

3. The electronic apparatus of claim 1, wherein the processor is further configured to control the electronic apparatus to:
identify at least one region from the obtained image in each of which one object is present, and identify a region of interest corresponding to the first co-reference based on a density of the identified region in the obtained image.

4. The electronic apparatus of claim 3, wherein the processor is further configured to control the electronic apparatus to:
identify a region of the identified region having a relatively low density from the obtained image as the region of interest based on the first co-reference referring to a singular object, and
identify a region of the identified region having a relatively high density from the obtained image as the region of interest based on the first co-reference referring to plural objects.

5. The electronic apparatus of claim 1,
wherein the memory is further configured to store information on a map of a space where the electronic apparatus is configured to operate and position information of objects that are present in space, and
wherein the processor is further configured to control the electronic apparatus to:

acquire position information where a type of object is present from the stored position information of the objects based on the first co-reference including information on the type of the object, and identify the region of interest matching the obtained position information from the obtained image based on the information on the map.

6. The electronic apparatus of claim 1, wherein the processor is further configured to control the electronic apparatus to:

identify at least one region in which an object is present in the obtained image, identify an object included in the region of interest among the identified regions, acquire information on an object referred to by the first co-reference based on the dialogue content including the first query, a previous query and a reply to the previous query, and identify the first object referred to by the first co-reference among objects included in a region in the region of interest based on the obtained information on the object.

7. The electronic apparatus of claim 6, wherein the processor is further configured to control the electronic apparatus to:

output a request for additional information based on the first object referred to by the first co-reference not being identified from the region of interest based on the obtained information on the object, acquire additional information on the object from the input re-query or reply based on a re-query or a reply being input based on the output request, and identify the first object referred to by the first co-reference among the objects included in the region of the region of interest based on the obtained additional information.

8. The electronic apparatus of claim 6, further comprising:
an actuator configured to move the electronic apparatus,
wherein the memory is further configured to store information on a map of a space in which the electronic apparatus is configured to operate and position information of objects that are present in the space,
wherein the processor is further configured to control the electronic apparatus to:

identify at least one object present in a vicinity of a point where the electronic apparatus is positioned on the map based on the stored position information based on the first object referred to by the first co-reference not being identified from the region of interest based on the obtained information on the object, and control the actuator to move to the point on the map in which the object related to the obtained information on the object is present based on the stored position information and based on an object related to the obtained information on the object not being present among the at least one object present in the vicinity.

9. The electronic apparatus of claim 1, wherein:
the camera is configured to be disposed on the electronic apparatus and to be rotatable,
the processor is configured to control the electronic apparatus to: determine a direction an indication or a direction of a gaze through an image captured through the camera,
adjust a capturing direction of the camera based on the determined direction, and identify a region of interest corresponding to the first co-reference through an image obtained through the adjusted camera.

10. The electronic apparatus of claim 9, further comprising:
an actuator configured to move the electronic apparatus,
wherein the memory is further configured to store information on a map of a space in which the electronic apparatus is configured to be operated, and
wherein the processor is further configured to control the electronic apparatus to control the actuator to cause the electronic apparatus to move to a point of an image in the determined direction not including the obstacle using information on the identified obstacle based on an obstacle being identified from an image obtained through the adjusted camera.

11. A method of controlling an electronic apparatus that provides a response to a first query, in response to the first query being input, the method comprising:

identifying a region of interest corresponding to a first co-reference in an image obtained through a camera based on the first co-reference being included in the first query, identifying a first object referred to by the first co-reference, among at least one object included in the identified region of interest based on a dialogue content that includes the first query, based on the first co-reference being included in the first query and a second co-reference being included in the first query or a second query which is input after the first query:

based on the first object referred to by the first co-reference included in the first query being identified in one region of the obtained image, determining a relative position relation between the first object and a second object referred to by the second co-reference based on a distance attribute of the first co-reference and the second co-reference, identifying a region that has the relative position relation with respect to the one region in the obtained image as a region of interest corresponding to the second co-reference, and providing information on the identified at least one of the first object or the second object as the reply.

12. The method of claim 11, wherein the identifying the region of interest comprises identifying a region positioned at a relatively close distance in the obtained image as the region of interest based on the first co-reference referring to an object at a close distance, and identifying a region positioned at a relatively far distance in the obtained image as the region of interest based on the first co-reference referring to an object at a far distance.

13. The method of claim 11, wherein the identifying the region of interest comprises identifying at least one region in which one object is present from the obtained image, and identifying a region of interest corresponding to the first co-reference based on a density of the identified region in the obtained image.

14. The method of claim 11, wherein the electronic apparatus is further configured to store information on a map of a space where the electronic apparatus is configured to operate and position information of objects that are present in the space, and wherein the identifying the region of interest comprises acquiring position information where a type of object is present from the stored position information of the objects based on the first co-reference including information on the type of object, and identifying the region of interest matching the obtained position information from the obtained image based on the information on the map.

15. The method of claim 11, wherein the identifying an object referred to by the first co-reference comprises:

identifying at least one region in the obtained image in which an object is present, identifying an object included in the region of interest among the identified regions, acquiring information on an object referred to by the first co-reference based on the dialogue content including the first query, a previous query and a reply to the previous query, and identifying the first object referred to by the first co-reference among objects included in a region in the region of interest based on the obtained information on the object.

16. The method of claim 15, wherein the identifying an object referred to by the first co-reference comprises outputting a request for additional information based on the first object referred to by the first co-reference not being identified from the region of interest based on the obtained information on the object, acquiring additional information on the object from an input re-query or reply based on a re-query or a reply being input based on the output request, and identifying first object referred to by the first co-reference among the objects included in the region of the region of interest based on the obtained additional information.

* * * * *